US009019259B2

(12) United States Patent
Ozawa et al.

(10) Patent No.: US 9,019,259 B2
(45) Date of Patent: Apr. 28, 2015

(54) TRANSMISSION APPARATUS, RECEPTION APPARATUS, TRANSMISSION-RECEPTION SYSTEM, AND IMAGE DISPLAY SYSTEM

(75) Inventors: Seiichi Ozawa, Wako (JP); Hironobu Akita, Tokyo (JP)

(73) Assignee: Thine Electronics, Inc., Tokyo (JP)

( * ) Notice: Subject to any disclaimer, the term of this patent is extended or adjusted under 35 U.S.C. 154(b) by 0 days.

(21) Appl. No.: 13/265,083

(22) PCT Filed: Apr. 22, 2010

(86) PCT No.: PCT/JP2010/057168
§ 371 (c)(1),
(2), (4) Date: Dec. 2, 2011

(87) PCT Pub. No.: WO2010/123076
PCT Pub. Date: Oct. 28, 2010

(65) Prior Publication Data
US 2012/0068995 A1    Mar. 22, 2012

(30) Foreign Application Priority Data

Apr. 23, 2009    (JP) .............................. P2009-105147

(51) Int. Cl.
*G09G 5/00*    (2006.01)
*H04L 7/00*    (2006.01)
(Continued)

(52) U.S. Cl.
CPC ............ *H04L 7/0008* (2013.01); *G09G 3/3611* (2013.01); *G09G 2310/08* (2013.01); *G09G 2370/08* (2013.01); *H04L 7/0091* (2013.01); *H04N 5/66* (2013.01); *H04N 5/12* (2013.01)

(58) Field of Classification Search
None
See application file for complete search history.

(56) References Cited

U.S. PATENT DOCUMENTS 6,359,815 B1 *    3/2002    Sato et al. ...................... 365/198
7,844,013 B2 *    11/2010    Hoshino et al. ................ 375/295
(Continued)

FOREIGN PATENT DOCUMENTS

JP    S63-9246 A    1/1988
JP    S63-67931 A    3/1988
(Continued)

OTHER PUBLICATIONS

International Preliminary Report on Patentability issued on Dec. 1, 2011 in the International Patent Application No. PCT/JP2010/057168.
(Continued)

*Primary Examiner* — William Boddie
*Assistant Examiner* — Bipin Gyawali
(74) *Attorney, Agent, or Firm* — Sughrue Mion, PLLC

(57) ABSTRACT

The present invention provides a transmission apparatus and a reception apparatus easy to sample data correctly by a clock in the reception apparatus. In a detection section 25 of a reception apparatus $20_n$, based on data output from a sampler section 23, both or either of detection of a phase difference between data received by a data reception section 21 and a clock received by a clock reception section 22, and/or waveform distortion of this data is performed. A detection signal indicating a result of detection by the detection section 25 is transmitted to a transmission apparatus 10 by a detection signal transmission section 26. In the transmission apparatus 10, by a control section 15, based on the detection signal received by a detection signal reception section 14, both or either of control of adjustment of a phase between data transmitted by a data transmission section 11 and a clock transmitted by a clock transmission section 12, and/or adjustment of an amplitude of the data is performed.

23 Claims, 22 Drawing Sheets

(51) Int. Cl.
*G09G 3/36* (2006.01)
*H04N 5/66* (2006.01)
*H04N 5/12* (2006.01)

(56) References Cited

U.S. PATENT DOCUMENTS

| | | | |
|---|---|---|---|
| 8,054,303 B2* | 11/2011 | Saeki | 345/204 |
| 2004/0047409 A1* | 3/2004 | Lee et al. | 375/232 |
| 2008/0180417 A1 | 7/2008 | Saeki | |
| 2009/0051675 A1* | 2/2009 | Huang | 345/204 |
| 2009/0103674 A1* | 4/2009 | Wang | 375/376 |
| 2011/0044424 A1* | 2/2011 | Leoncavallo | 377/124 |

FOREIGN PATENT DOCUMENTS

| | | |
|---|---|---|
| JP | 9-69829 A | 3/1997 |
| JP | 11-177540 A | 7/1999 |
| JP | 2005-338727 A | 12/2005 |
| JP | 2006-109208 A | 4/2006 |
| JP | 2007053648 A | 3/2007 |
| JP | 2007274139 A | 10/2007 |
| KR | 10-0601149 | 7/2006 |
| WO | WO 99/46687 A1 | 9/1999 |

OTHER PUBLICATIONS

International Search Report for PCT/JP2010/057168, mailed May 25, 2010.

Office Action issued by the Korean Patent Office in Korean Application No. 10-2011-7023715 dated Feb. 15, 2013.

Office Action issued by Korean Patent Office in Korean Application No. 10-2011-7023715 dated Dec. 26, 2013.

Office Action issued by Japanese Patent Office in Japanese Application No. 2009-105147 dated Nov. 26, 2013.

* cited by examiner

*Fig.10*

| D1 | XD | D2 | Judge | Edge | Early | Late | Unlock |
|----|----|----|-------|------|-------|------|--------|
| 0 | 0 | 0 | WITHOUT EDGE | 0 | 0 | 0 | 0 |
| 0 | 0 | 1 | WITH EDGE/Clock Early | 1 | 1 | 0 | 0 |
| 0 | 1 | 0 | WITHOUT EDGE/Unlock | 0 | 0 | 0 | 1 |
| 0 | 1 | 1 | WITH EDGE/Clock Late | 1 | 0 | 1 | 0 |
| 1 | 0 | 0 | WITH EDGE/Clock Late | 1 | 0 | 1 | 0 |
| 1 | 0 | 1 | WITHOUT EDGE/Unlock | 0 | 0 | 0 | 1 |
| 1 | 1 | 0 | WITH EDGE/Clock Early | 1 | 1 | 0 | 0 |
| 1 | 1 | 1 | WITHOUT EDGE | 0 | 0 | 0 | 0 |

Fig.14

| D0 | D1 | XD | D2 | Judge | Edge | Under equalize | Over equalize | Unlock |
|---|---|---|---|---|---|---|---|---|
| 0 | 0 | 0 | 0 | WITHOUT EDGE | 0 | 0 | 0 | 0 |
| 0 | 0 | 0 | 1 | WITH EDGE/Under equalize | 1 | 1 | 0 | 0 |
| 0 | 0 | 1 | 0 | WITHOUT EDGE/Unlock | 0 | 0 | 0 | 1 |
| 0 | 0 | 1 | 1 | WITH EDGE/Over equalize | 1 | 0 | 1 | 0 |
| 0 | 1 | 0 | 0 | WITH EDGE/Under equalize | 1 | 1 | 0 | 0 |
| 0 | 1 | 0 | 1 | WITHOUT EDGE/Unlock | 0 | 0 | 0 | 1 |
| 0 | 1 | 1 | 0 | WITH EDGE/Over equalize | 1 | 0 | 1 | 0 |
| 0 | 1 | 1 | 1 | WITHOUT EDGE | 0 | 0 | 0 | 0 |
| 1 | 0 | 0 | 0 | WITHOUT EDGE | 0 | 0 | 0 | 0 |
| 1 | 0 | 0 | 1 | WITH EDGE/Over equalize | 1 | 0 | 1 | 0 |
| 1 | 0 | 1 | 0 | WITHOUT EDGE/Unlock | 0 | 0 | 0 | 1 |
| 1 | 0 | 1 | 1 | WITH EDGE/Under equalize | 1 | 1 | 0 | 0 |
| 1 | 1 | 0 | 0 | WITH EDGE/Over equalize | 1 | 0 | 1 | 0 |
| 1 | 1 | 0 | 1 | WITHOUT EDGE/Unlock | 0 | 0 | 0 | 1 |
| 1 | 1 | 1 | 0 | WITH EDGE/Under equalize | 1 | 1 | 0 | 0 |
| 1 | 1 | 1 | 1 | WITHOUT EDGE | 0 | 0 | 0 | 0 |

TRANSMISSION APPARATUS, RECEPTION APPARATUS, TRANSMISSION-RECEPTION SYSTEM, AND IMAGE DISPLAY SYSTEM

TECHNICAL FIELD

The present invention relates to a transmission apparatus, a reception apparatus, a transmission-reception system, and an image display system.

BACKGROUND ART

An image display system such as a liquid crystal display system, is provided with a transmission apparatus, a reception apparatus and an image display section, and transmits image data and a clock, from the transmission apparatus to which an image signal has been input from the outside, to the reception apparatus, and samples, in the reception apparatus, the image data by the clock, and sends out the image data acquired by this sampling into a signal line, and displays the image in the image display section based on the image data sent to this signal line. In the image display system such as the liquid crystal display system, generally, the above-mentioned transmission apparatus or an apparatus containing this is referred to as a "timing controller", and the above-mentioned reception apparatus or an apparatus containing this is referred to as a "driver."

In the image display system like this, it is important to sample image data correctly by a clock in the reception apparatus. However, in the case where a phase difference (skew) between data and a clock which have reached the reception apparatus is large, or in the case where waveform deterioration of the data which has reached the reception apparatus is large, it may be impossible to sample the data correctly.

In Patent Literature 1, the invention intending to resolve a problem of the above-mentioned skew has been disclosed. The invention disclosed in the reference is one which has stored information on the above-mentioned skew in advance in the transmission apparatus, and gives a predetermined phase difference between data and a clock when transmitting them based on the above-mentioned skew information, and tries to make the skew between the data and clock in the reception apparatus smaller.

CITATION LIST

Patent Literature

[Patent Literature 1]
Japanese Patent Application Laid-Open No. 2005-338727

SUMMARY OF INVENTION

Technical Problem

However, in the invention disclosed in Patent Literature 1, because of the need of storing the skew in advance in the transmission apparatus for every image display system, effort and time are required to perform measurement and storage of the skew. Moreover, since the skew may change depending on environmental variations such as temperature or the like, there may be a case where it becomes impossible to sample data correctly by the skew stored by taking time and effort, as mentioned above. Moreover, the invention disclosed in Patent Literature 1, although intending to resolve the problem of the skew, can not resolve the problem of the waveform deterioration of the data in the reception apparatus. In this way, by the invention disclosed in Patent Literature 1, it is not easy to sample, by the clock, the image data correctly in the reception apparatus.

The present invention has been made in order to resolve the above-mentioned problem, and the object is to provide a transmission apparatus and reception apparatus which can easily sample data correctly by a clock in a reception apparatus. In addition, the object is also to provide a transmission-reception system provided with such a transmission apparatus and reception apparatus, as well as an image display system provided with such a transmission apparatus, reception apparatus and image display section.

Solution to Problem

A transmission apparatus according to the present invention, that transmits data and a clock to a reception apparatus, comprises: (1) a data transmission section that transmits the data to the reception apparatus; (2) a clock transmission section that transmits the clock to the reception apparatus; (3) a detection signal reception section that receives, from the reception apparatus, a detection signal indicating both or either of a phase difference between data and a clock, and/or waveform distortion of the data, which have been detected in the reception apparatus that has received the data transmitted by the data transmission section and the clock transmitted by the clock transmission section; and (4) a control section that performs, based on the detection signal received by the detection signal reception section, control of both or either of adjustment of a phase between the data transmitted by the data transmission section and the clock transmitted by the clock transmission section, and/or adjustment of an amplitude of the data transmitted by the data transmission section.

A reception apparatus according to the present invention, that receives data and a clock from a transmission apparatus, comprises: (1) a data reception section that receives the data from the transmission apparatus; (2) a clock reception section that receives the clock from the transmission apparatus; (3) a sampler section that samples, by the clock received by the clock reception section, the data received by the data reception section and outputs the data acquired by this sampling; (4) a detection section that performs, based on the data output from the sampler section, detection of both or either of a phase difference between the data received by the data reception section and the clock received by the clock reception section, and/or waveform distortion of the data received by the data reception section; and (5) a detection signal transmission section that transmits a detection signal indicating a result of detection by the detection section to the transmission apparatus.

In a transmission-reception system according to the present invention, (1) the system comprises a transmission apparatus according to the present invention and a reception apparatus according to the present invention, wherein (2) a data reception section of the reception apparatus receives data transmitted by a data transmission section of the transmission apparatus, (3) a clock reception section of the reception apparatus receives a clock transmitted by a clock transmission section of the transmission apparatus, and (4) a detection signal reception section of the transmission apparatus receives a detection signal transmitted by a detection signal transmission section of the reception apparatus.

The transmission-reception system provided with the transmission apparatus and reception apparatus according to the present invention operates as follows. The data transmitted from the data transmission section of the transmission apparatus is received by the data reception section of the reception apparatus. The clock transmitted from the clock transmission section of the transmission apparatus is received by the clock reception section of the reception apparatus. In the sampler section of the reception apparatus, the data received by the data reception section is sampled by the clock received by the clock reception section, and the data acquired by this sampling is output. In the detection section of the reception apparatus, based on the data output from the sampler section, there is performed a detection of both or either of a phase difference between the data received by the data reception section and the clock received by the clock reception section, and/or the waveform distortion of the data received by the data reception section. The detection signal indicating a result of the detection by the detection section is transmitted to the transmission apparatus by the detection signal transmission section of the reception apparatus. The detection signal transmitted to the transmission apparatus from the reception apparatus is received by the detection signal reception section of the transmission apparatus. In the transmission apparatus, by the control section, based on the detection signal received by the detection signal reception section, there is performed a control of both or either of adjustment of the phase between the data transmitted by the data transmission section and the clock transmitted by the clock transmission section, and/or adjustment of an amplitude of the data transmitted by the data transmission section. Therefore, by the phase or amplitude being adjusted by the control section in the transmission apparatus, it becomes easy to sample the data correctly by the clock in the reception apparatus.

In the transmission apparatus according to the present invention, it is preferable that the control section causes the data transmission section to transmit, to the reception apparatus, detection signal transmission instruction data that instructs the reception apparatus to transmit the detection signal. In the reception apparatus according to the present invention, it is preferable that (1) the data reception section receives the detection signal transmission instruction data that instructs the reception apparatus to transmit the detection signal, from the transmission apparatus, and (2) the detection signal transmission section, in response to the data reception section having received the detection signal transmission instruction data, transmits the detection signal to the transmission apparatus. In addition, it is preferable that the transmission-reception system according to the present invention (1) comprises the transmission apparatus and the reception apparatus, (2) the data reception section of the reception apparatus receives the data and the detection signal transmission instruction data which are transmitted by the data transmission section of the transmission apparatus, (3) the clock reception section of the reception apparatus receives the clock transmitted by the clock transmission section of the transmission apparatus, and (4) the detection signal reception section of the transmission apparatus receives the detection signal transmitted by the detection signal transmission section of the reception apparatus. In this case, in the transmission apparatus, based on the control by the control section, the detection signal transmission instruction data that instructs the reception apparatus to transmit the detection signal is transmitted from the data transmission section. In the reception apparatus, the detection signal transmission instruction data is received by the data reception section, and in response to this, the detection signal is transmitted to the transmission apparatus by the detection signal transmission section. Furthermore, it is prefererable that as for the transmission-reception system according to the present invention, the transmission apparatus includes a plurality of data transmission sections, and the plurality of data transmission sections included in the transmission apparatus and a plurality of reception apparatuses are associated with each other on a one-to-one basis, and the transmission, from the transmission apparatus to each of the plurality of reception apparatuses, of the detection signal transmission instruction data is performed at a different timing from each other, and the transmission, from each of the plurality of reception apparatuses to the transmission apparatus, of the detection signal is performed at a different timing from each other.

In the transmission apparatus according to the present invention, It is preferable to comprise a plurality of sets of data transmission sections and clock transmission sections. In addition, it is preferable that in the transmission-reception system according to the present invention, (1) the system comprises this transmission apparatus and a plurality of reception apparatuses, (2) the plurality of data transmission sections included in the transmission apparatus and the plurality of reception apparatuses are associated with each other on a one-to-one basis, (3) the data reception section of each of the plurality of reception apparatuses receives the data transmitted by the corresponding data transmission section included in the transmission apparatus, (4) the clock reception section of each of the plurality of reception apparatuses receives the clock transmitted by the corresponding clock transmission section included in the transmission apparatus, and (5) the detection signal reception section of the transmission apparatus receives the detection signal transmitted by the detection signal transmission section of each of the plurality of reception apparatuses.

In the transmission apparatus according to the present invention, it is preferable to comprise a plurality of data transmission sections and one clock transmission section. In addition, it is preferable that in the transmission-reception system according to the present invention, (1) the system comprises this transmission apparatus and a plurality of reception apparatuses, (2) the plurality of data transmission sections included in the transmission apparatus and the plurality of reception apparatuses are associated with each other on a one-to-one basis, (3) the data reception section of each of the plurality of reception apparatuses receives the data transmitted by the corresponding data transmission section included in the transmission apparatus, (4) the clock reception section of each of the plurality of reception apparatuses receives the clock transmitted by the clock transmission section of the transmission apparatus, and (5) the detection signal reception section of the transmission apparatus receives the detection signal transmitted by the detection signal transmission section of each of the plurality of reception apparatuses.

It is preferable that in the transmission apparatus according to the present invention, the control section adjusts selectively a bit data amplitude after data level transition at the time of performing control of adjustment of an amplitude of the data transmitted by the data transmission section.

It is preferable that in the reception apparatus according to the present invention, the sampler section samples and outputs also the data at the time of bit transition among the data received by the data reception section, and the detection section performs detection of both or either of the phase difference and/or the waveform distortion based on the data, at the time of bit transition, which has been sampled and output by the sampler section.

It is preferable that as for the transmission-reception system according to the present invention, the detection signal reception section of the transmission apparatus receives, via a common signal line, the detection signal transmitted by the detection signal transmission section of each of a plurality of reception apparatuses.

The image display system according to the present invention comprises the transmission-reception system according to the present invention described above, and an image display section that displays an image based on the data received by each of a plurality of reception apparatuses included in the transmission-reception system.

Effects of Invention

According to the present invention, it becomes easy to sample the data correctly by the clock in the reception apparatus.

BRIEF DESCRIPTION OF DRAWINGS

FIG. 10 is a table explaining operation of the first configuration example of the detection section 25 of the reception apparatus $20_n$ according to the present embodiment;

FIG. 14 is a table explaining operation of the second configuration example of the detection section 25 of the reception apparatus $20_n$ according to the present embodiment;

DESCRIPTION OF EMBODIMENTS

Hereinafter, with reference to the accompanying drawings, a configuration for carrying out the present invention will be described in detail. In description of the drawings, the same symbol is given to the same element, and overlapping description is omitted.

Figure 1:
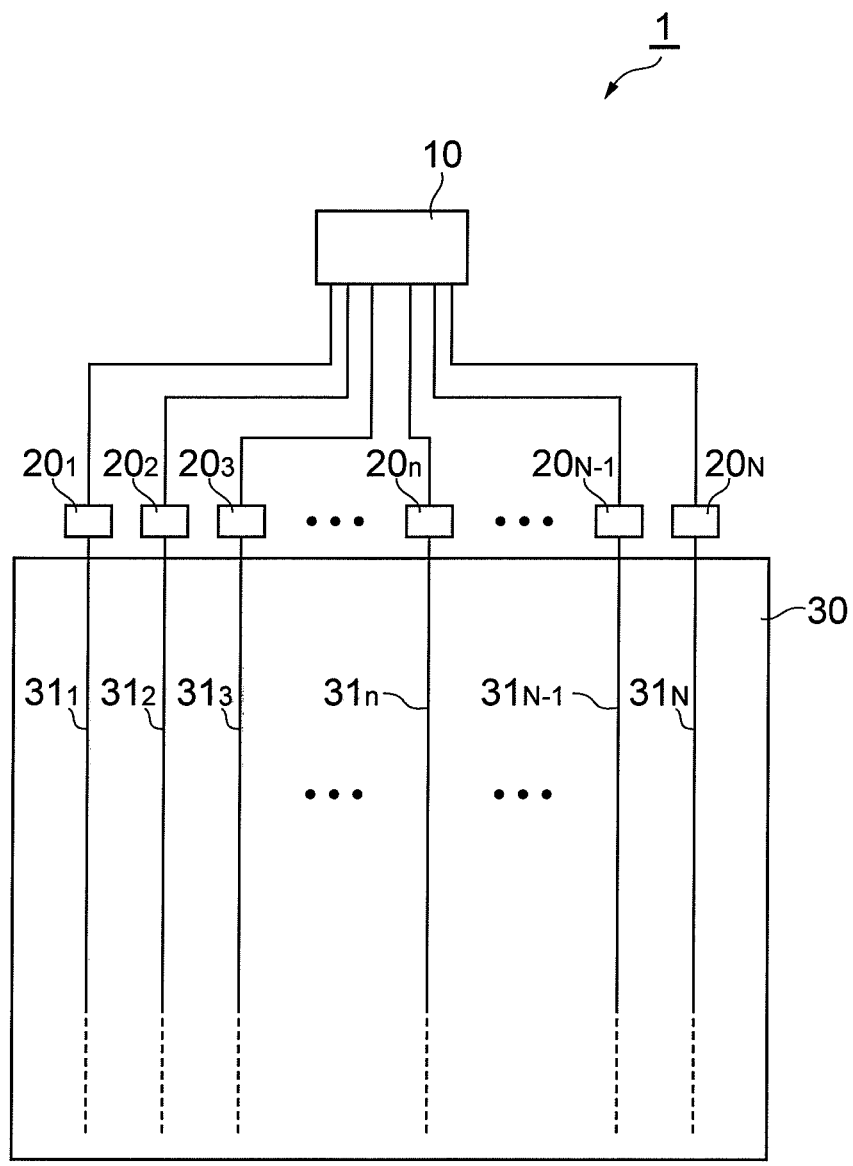
FIG. 1 is a schematic diagram illustrating a configuration of an image display system 1 according to the present embodiment.

FIG. 1 is a schematic diagram illustrating a configuration of an image display system 1 according to the present embodiment. The image display system 1 shown in this diagram is provided with a transmission apparatus 10, N reception apparatuses $20_1$ to $20_N$, and an image display section 30. Here, N is an integer not less than 2, and n appearing in below is each an integer that is 1 or more, and N or less. In this diagram, as for a drive section and signal line for vertical scanning of an image in the image display section 30, illustration has been omitted.

The transmission apparatus 10 inputs an image signal from the outside, and transmits image data and a clock to each of N reception apparatuses $20_1$ to $20_N$. Each reception apparatus $20_n$ receives the image data and clock which has been sent and arrived from the transmission apparatus 10, samples the image data by the clock, and sends the image data acquired by this sampling to signal lines $31_n$ of the image display section 30. The image display section 30 is a liquid crystal panel, for example, and based on the image data supplied to signal lines $31_n$ by each reception apparatus $20_n$, displays the image. The number of signal lines $31_n$ may be one or more.

Figure 2:
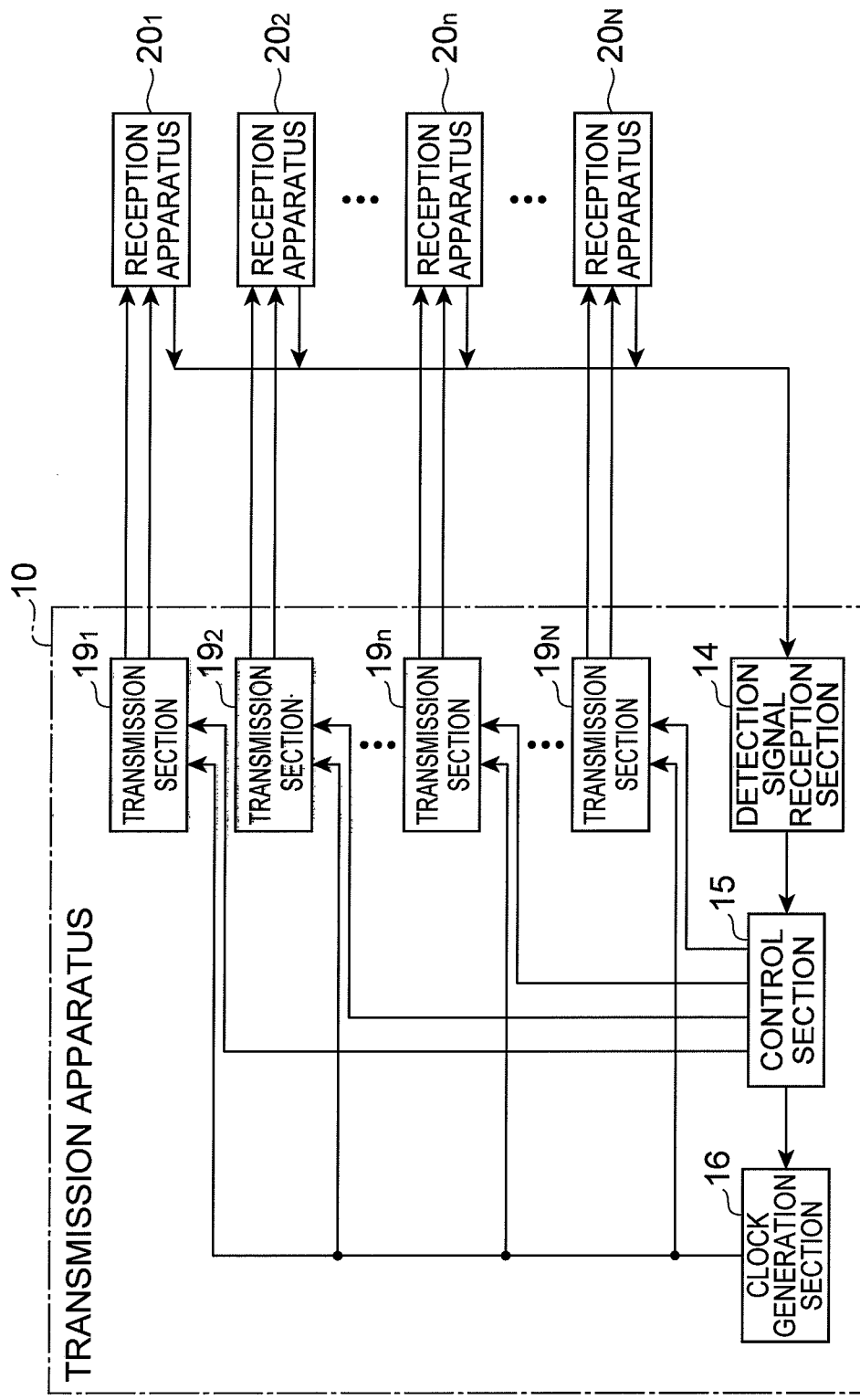
FIG. 2 is a schematic diagram illustrating a configuration of a transmission-reception system provided with an transmission apparatus 10, and N reception apparatuses $20_1$ to $20_N$ according to the present embodiment.

FIG. 2 is a schematic diagram illustrating a configuration of a transmission-reception system provided with an transmission apparatus 10, and N reception apparatuses $20_1$ to $20_N$ according to the present embodiment. The transmission apparatus 10 is provided with a detection signal reception section 14, a control section 15, a clock generation section 16, and N transmission sections $19_1$ to $19_N$. Each transmission section $19_n$ includes a set of a data transmission section and clock transmission section. N transmission sections $19_1$ to $19_1$ have a common configuration. N reception apparatuses $20_1$ to $20_N$ have a common configuration. The transmission section $19_n$ and the reception apparatus $20_n$ are associated with each other on a one-to-one basis.

The transmission section 19n of the transmission apparatus 10 transmits data and a clock to the reception apparatus $20_n$. The reception apparatus $20_n$ receives the data and clock which has been sent from the transmission section $19_n$, samples the data by this clock, and outputs the data acquired by this sampling. The reception apparatus $20_n$ detects both or either of a phase difference between the received data and clock, and/or waveform distortion of the data, and sends out a detection signal indicating a result of detection thereof to the transmission apparatus 10.

The detection signal reception section 14 of the transmission apparatus 10 receives the detection signal sent from each reception apparatus $20_n$. The control section 15, based on the detection signal received by the detection signal reception section 14, performs control of both or either of a phase adjustment between the data and clock transmitted from the transmission section $19_n$ and/or an amplitude adjustment of this data. The clock generation section 16 generates a reference clock instructing timing, serving as reference at the time of each transmission section $19_n$ of the transmission apparatus 10 sending out the data and clock, and gives this clock to each transmission section $19_n$.

Each signal line of the data and clock between the transmission section $19_n$ of the transmission apparatus 10 and the reception apparatus $20_n$, as well as the signal line of the detection signal between the detection signal reception section 14 of the transmission apparatus 10 and the reception apparatus $20_n$ may be one line physically, or one pair of lines which transmit differential data like Low-Voltage Differential Signaling (LVDS).

Figure 3:
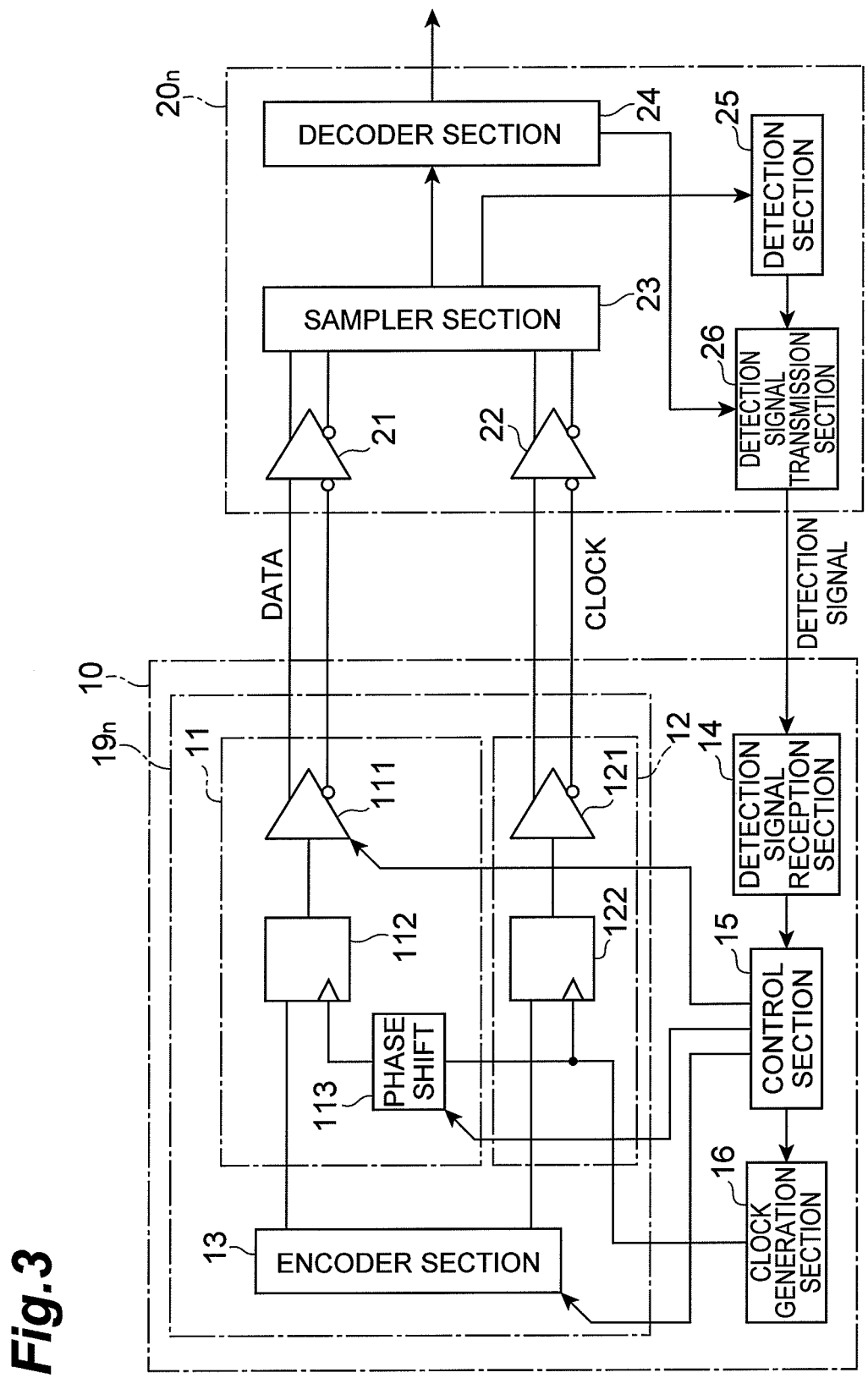
FIG. 3 is a diagram illustrating a configuration of the transmission apparatus 10 and the reception apparatus $20_n$ according to the present embodiment.

FIG. 3 is a diagram illustrating a configuration of the transmission apparatus 10 and the reception apparatus $20_n$ according to the present embodiment. This diagram illustrates in detail a configuration of the n-th transmission section $19_n$ of the N transmission sections $19_1$ to $19_N$ included in the transmission apparatus 10, as well as a configuration of the reception apparatus $20_n$ corresponding to this transmission section $19_n$.

The transmission section $19_n$ includes a data transmission section 11, a clock transmission section 12 and an encoder section 13. The encoder section 13 gives a signal which controls a clock to be transmitted to the reception apparatus $20_n$ to the clock transmission section 12, and at the same time, gives the clock to be transmitted to the reception apparatus $20_n$ to the clock transmission section 12.

The data transmission section 11, which transmits data to the reception apparatus $20_n$, includes a buffer 111, a flip-flop 112 and a phase shift part 113. The phase shift part 113 inputs the reference clock output from the clock generation section 16, and shifts a phase of the reference clock by a phase shifting amount instructed by the control section 15, and outputs it to the flip-flop 112. The flip-flop 112 latches the data output from the encoder section 13 at the timing instructed by the clock output from the phase shift part 113, and outputs the latched data to the buffer 111. The buffer 111 transmits the data output from the flip-flop 112 to the reception apparatus $20_n$ at the amplitude instructed by the control section 15.

The clock transmission section 12, which transmits a clock to the reception apparatus $20_n$, includes a buffer 121 and a flip-flop 122. The flip-flop 122 latches the clock output from the encoder section 13 at the timing instructed by the reference clock output from the clock generation section 16, and outputs the latched data to the buffer 121. The buffer 121 transmits the data output from the flip-flop 112 to the reception apparatus $20_n$.

The detection signal reception section 14 receives a detection signal sent from the reception apparatus $20_n$. The detection signal received by the detection signal reception section 14 indicates both or either of the phase difference between the data and clock and/or the waveform distortion of the data detected in the reception apparatus $20_n$ which has received the data transmitted by the data transmission section 11 and the clock transmitted by the clock transmission section 12.

The control section 15, based on the detection signal received by the detection signal reception section 14, by controlling the phase shifting amount of the reference clock in the phase shift part 113 of the data transmission section 11, adjusts a phase between the data transmitted by the data transmission section 11 and the clock transmitted by the clock transmission section 12. In addition, the control section 15, by controlling an output amplitude in the buffer 111 of the data transmission section 11, adjusts an amplitude of the data transmitted by the data transmission section 11. Furthermore, it is preferable that the control section 15 causes the encoder section 13 to output detection signal transmission instruction data which instructs the reception apparatus $20_n$ to transmit the detection signal, and causes the data transmission section 11 to transmit it to the reception apparatus $20_n$.

The reception apparatus $20_n$ includes a data reception section 21, a clock reception section 22, a sampler section 23, a decoder section 24, a detection section 25 and a detection signal transmission section 26. The data reception section 21 receives data sent from the data transmission section 11 of the transmission apparatus 10. The clock reception section 22 receives a clock sent from the clock transmission section 12 of the transmission apparatus 10.

The sampler section 23, by the clock received by the clock reception section 22, samples the data received by the data reception section 21, and outputs the data acquired by this sampling to the decoder section 24 and the detection section 25. The decoder section 24 sends the data output from the sampler section 23 to the signal line $31_n$.

The detection section 25, based on the data output from the sampler section 23, detects both or either of a phase difference between the data received by the data reception section 21 and the clock received by the clock reception section 22 and/or waveform distortion of the data received by the data reception section 21. The detection signal transmission section 26 transmits a detection signal indicating the result of detection by the detection section 25 to the detection signal reception section 14 of the transmission apparatus 10.

When the data transmission section 11 of the transmission apparatus 10 transmits, to the reception apparatus $20_n$, the detection signal transmission instruction data which instructs to transmit the detection signal, the decoder section 24 determines that the data which has been received by the data reception section 22 and sampled by the sampler section 23 is the detection signal transmission instruction data, and the detection signal transmission section 26 transmits the detection signal in response to this determination in the decoder section 24. Meanwhile, the detection signal may be one which is based on the result of the detection started after determining the detection signal transmission instruction data, and may be one which is based on the result detected beforehand.

The transmission-reception system configured as described above according to the present embodiment operates as follows. Data transmitted from the data transmission section 11 of the transmission apparatus 10 is received by the data reception section 21 of the reception apparatus $20_n$. A clock transmitted from the clock transmission section 12 of the transmission apparatus 10 is received by the clock reception section 22 of the reception apparatus $20_n$. In the sampler section 23 of the reception apparatus $20_n$, the data received by the data reception section 21 is sampled by the clock received by the clock reception section 22, and the data acquired by this sampling is output. This data is sent to the signal line $31_n$ through the decoder section 24, and is used for image-displaying in the image display section 30.

In the detection section 25 of the reception apparatus $20_n$, detection of both or either of the phase difference between the data received by the data reception section 21 and the clock received by the clock reception section 22 and/or the waveform distortion of the data received by the data reception section 21 is performed based on the data output from the sampler section 23. The detection signal indicating the result of the detection by the detection section 25 is transmitted to the transmission apparatus 10 by the detection signal transmission section 26 of the reception apparatus $20_n$. The detection signal transmitted from the reception apparatus $20_n$ to the transmission apparatus 10 is received by the detection signal reception section 14 of the transmission apparatus 10.

In the transmission apparatus 10, by the control section 15, based on the detection signal received by the detection signal reception section 14, control of both or either of adjustment of a phase between data transmitted by the data transmission section 11 and a clock transmitted by the clock transmission section 12, and/or adjustment of an amplitude of the data transmitted by the data transmission section 11 is performed. In this way, by the phase or the amplitude being adjusted by the control section 15 in the transmission apparatus 10, it becomes easy to sample the data correctly by the clock in the reception apparatus $20_n$.

Furthermore, in the case where the detection signal transmission instruction data which instructs to transmit the detection signal is sent from the transmission apparatus 10 to the reception apparatus $20_n$, in the reception apparatus $20_n$, this detection signal transmission instruction data is received by the data reception section 21, and in response to this, the detection signal is transmitted to the transmission apparatus 10 by the detection signal transmission section 25. In FIG. 3, a clock whose phase has been shifted is input into "clock" for the data transmission section. However, as long as a phase between the data and clock can be changed, the clock whose phase has not been shifted may be input to the data transmission section 11, the clock whose phase has been shifted may be input to the clock transmission section 12. Moreover, since it is an object to change the phase between the data and clock, it may be possible to generate a plurality of clocks each having a different phase by the clock generation section 16 and select, in a portion corresponding to a phase shift circuit, a suitable clock from the plurality of clocks.

Figure 4:
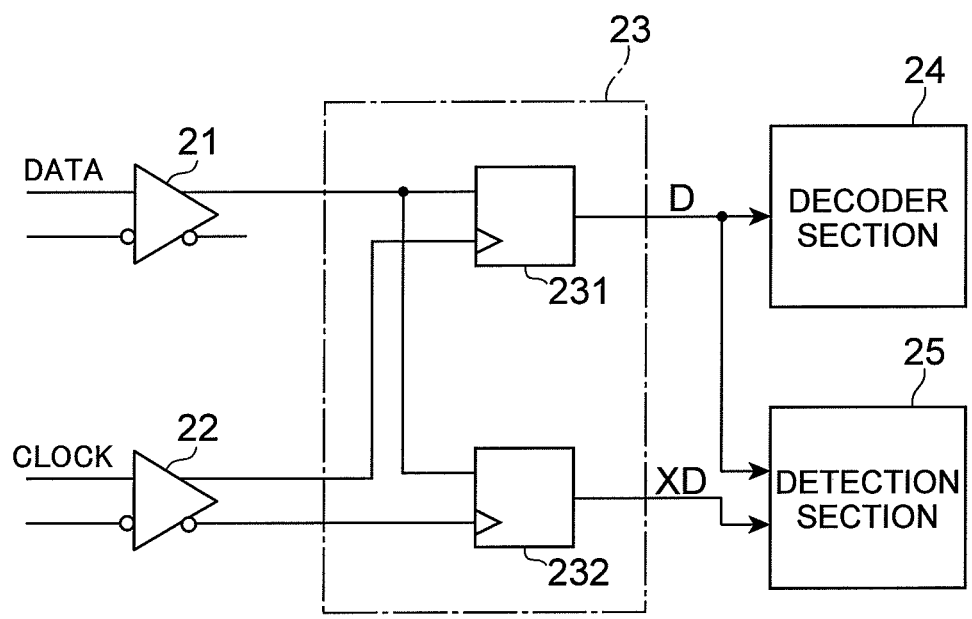
FIG. 4 is a diagram illustrating a configuration of a first configuration example of a sampler section 23 of the reception apparatus $20_n$ according to the present embodiment.
Figure 5:
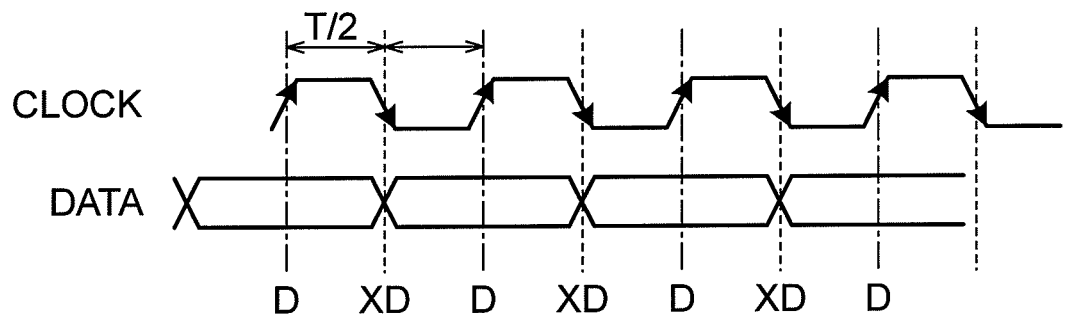
FIG. 5 is a diagram explaining operation of the first configuration example of the sampler section 23 of the reception apparatus $20_n$ according to the present embodiment.

Next, by using FIGS. 4 and 5, a first configuration example of the sampler section 23 of the reception apparatus $20_n$ according to the present embodiment will be described. FIG. 4 is a diagram illustrating a configuration of the first configuration example of the sampler section 23 of the reception apparatus $20_n$ according to the present embodiment. FIG. 5 is a diagram explaining operation of the first configuration example of the sampler section 23 of the reception apparatus $20_n$ according to the present embodiment.

The sampler section 23 of this first configuration example includes a flip-flop 231 and a flip-flop 232. In the sampler section 23 of the first configuration example, a frequency of the clock which is sent from the clock transmission section 12 of the transmission apparatus 10 and is received by the clock reception section 22 of the reception apparatus $20_n$ will be the same as a bit rate of the data which is sent from the data transmission section 11 of the transmission apparatus 10 and is received by the data reception section 21 of the reception apparatus $20_n$. That is, if, for example, the bit rate is 10 Gbps, the clock frequency will be 10 GHz.

In the sampler section 23 of the first configuration example, the flip-flop 231 latches the data output from the data reception section 21 at the timing instructed by a rising edge of the clock output from the clock reception section 22, and outputs the latched data D to the decoder section 24 and detection section 25. This data D indicates a value of each bit of the data which is sent from the data transmission section 11 of the transmission apparatus 10 and is received by the data reception section 21 of the reception apparatus $20_n$.

The flip-flop 232 latches the data output from the data reception section 21 at the timing instructed by a falling edge of the clock output from the clock reception section 22, and outputs the latched data XD to the detection section 25. This data XD indicates a value at the time of bit transition of the data which is sent from the data transmission section 11 of the transmission apparatus 10 and is received by the data reception section 21 of the reception apparatus $20_n$.

Figure 6:
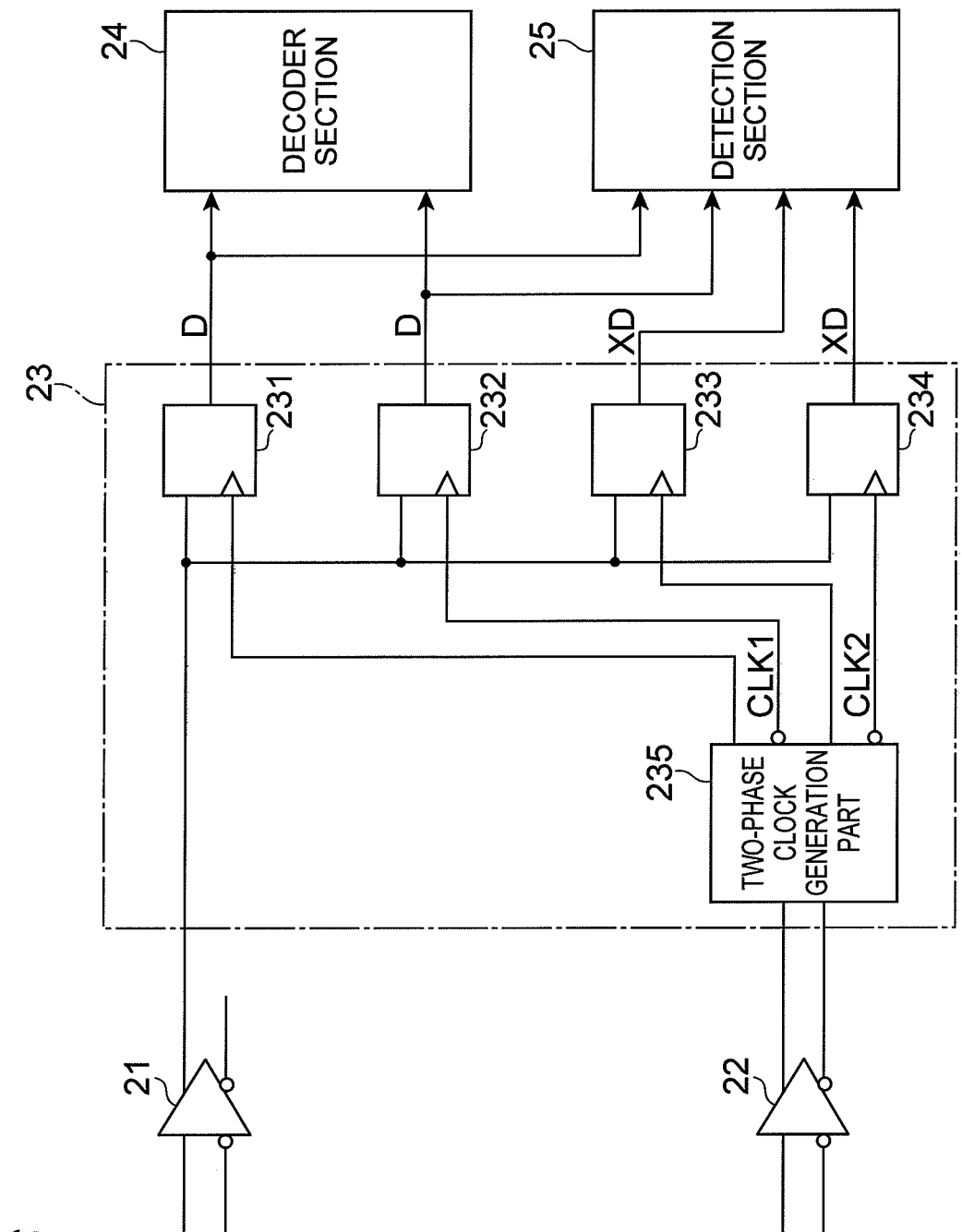
FIG. 6 is a diagram illustrating a configuration of a second configuration example of the sampler section 23 of the reception apparatus $20_n$ according to the present embodiment.
Figure 7:
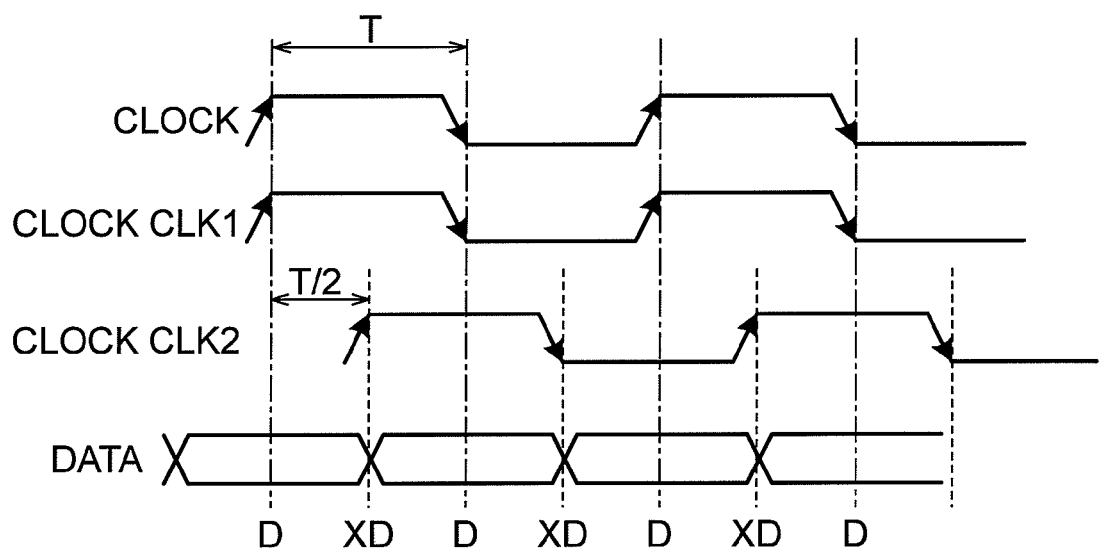
FIG. 7 is a diagram explaining operation of the second configuration example of the sampler section 23 of the reception apparatus $20_n$ according to the present embodiment.

Next, by using FIGS. 6 and 7, a second configuration example of the sampler section 23 of the reception apparatus $20_n$ according to the present embodiment will be described. FIG. 6 is a diagram illustrating a configuration of the second configuration example of the sampler section 23 of the reception apparatus $20_n$ according to the present embodiment. FIG. 7 is a diagram explaining operation of the second configuration example of the sampler section 23 of the reception apparatus $20_n$ according to the present embodiment.

The sampler section 23 of this second configuration example includes flip-flops 231 to 234, and a two-phase clock generation section 235. In the sampler section 23 of the second configuration example, a frequency of the clock which is sent from the clock transmission section 12 of the transmission apparatus 10 and is received by the clock reception section 22 of the reception apparatus $20_n$ is set to be the same as a bit rate of the data which is sent from the data transmission section 11 of the transmission apparatus 10 and is received by the data reception section 21 of the reception apparatus $20_n$.

In the sampler section 23 of the second configuration example, the two-phase clock generation section 235 inputs a clock output from the clock reception section 22, and based on this clock, generates two-phase clocks CLK1 and CLK2.

The flip-flop 231 latches the data output from the data reception section 21 at the timing instructed by a rising edge of a first clock CLK1 output from the two-phase clock generation section 235, and outputs the latched data D to the decoder section 24 and detection section 25. The flip-flop 232 latches the data output from the data reception section 21 at the timing instructed by a falling edge of the first clock CLK1 output from the two-phase clock generation section 235, and outputs the latched data D to the decoder section 24 and detection section 25. These data D each indicate a value of each bit of the data which is sent from the data transmission section 11 of the transmission apparatus 10 and is received by the data reception section 21 of the reception apparatus $20_n$.

The flip-flop 233 latches the data output from the data reception section 21 at the timing instructed by a rising edge of a second clock CLK2 output from the two-phase clock generation section 235, and outputs the latched data D to the detection section 25. The flip-flop 234 latches the data output from the data reception section 21 at the timing instructed by a falling edge of the second clock CLK2 output from the two-phase clock generation section 235, and outputs the latched data D to the detection section 25. These data XD each indicate a value at the time of bit transition of the data which is sent from the data transmission section 11 of the transmission apparatus 10 and is received by the data reception section 21 of the reception apparatus $20_n$.

In any of the first configuration example and the second configuration example described above, the sampler section 23 outputs the data D of each bit of data which is sent from the data transmission section 11 of the transmission apparatus 10 and is received by the data reception section 21 of the reception apparatus $20_n$, as well as the data XD at the time of bit transition of the data. The decoder section 24 inputs the data D output from the sampler section 23. The detection section 25 inputs the data D and data XD which are output from the sampler section 23, and based on such data, detects both or either of phase difference between the data received by the data reception section 21 and the clock received by the clock reception section 22, and/or waveform distortion of the data received by the data reception section 21.

Figure 8:
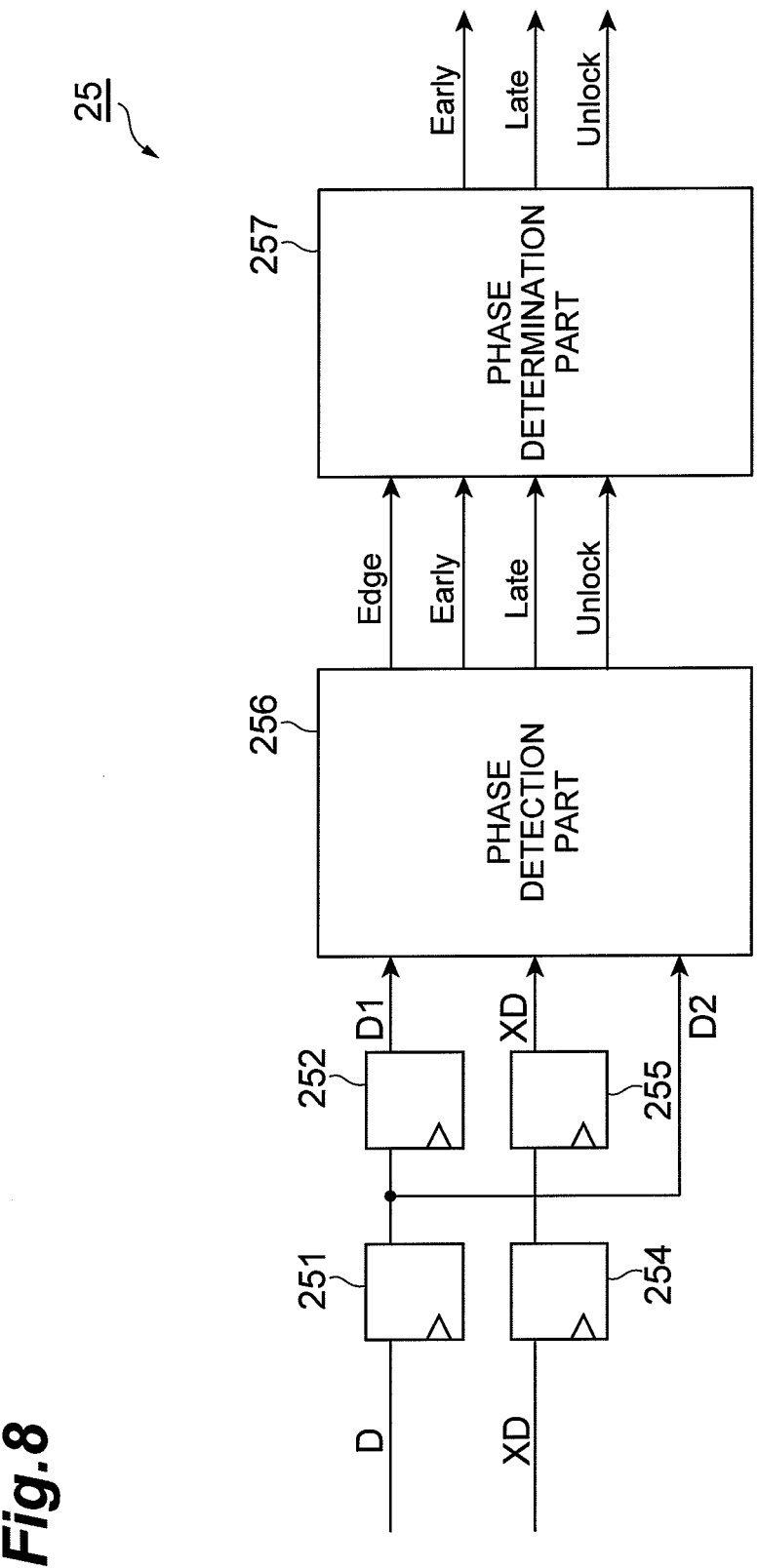
FIG. 8 is a diagram illustrating a configuration of a first configuration example of a detection section 25 of the reception apparatus $20_n$ according to the present embodiment.
Figure 9:
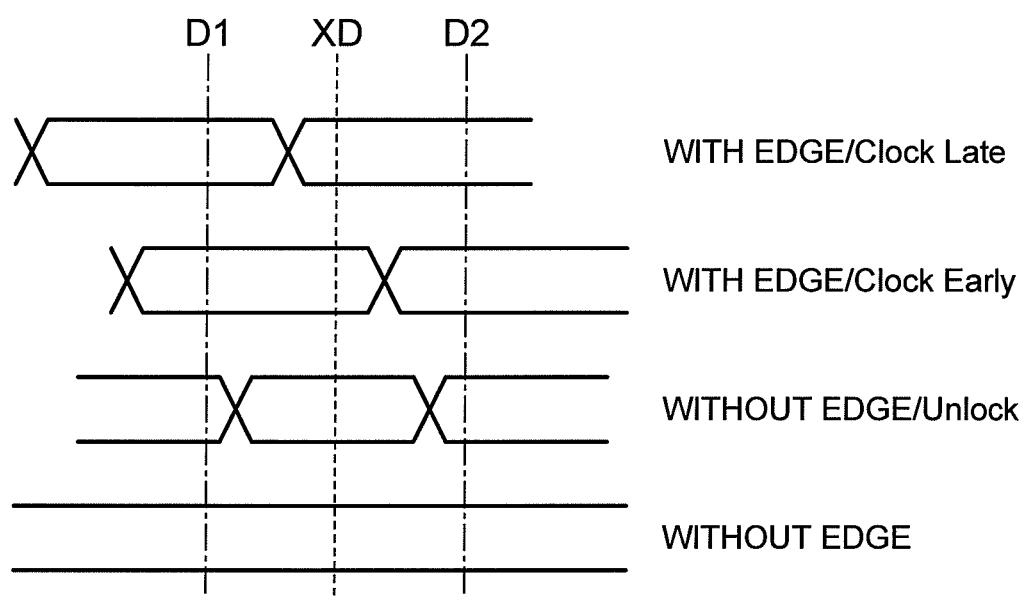
FIG. 9 is a diagram explaining operation of the first configuration example of the detection section 25 of the reception apparatus $20_n$ according to the present embodiment.
Figure 11:
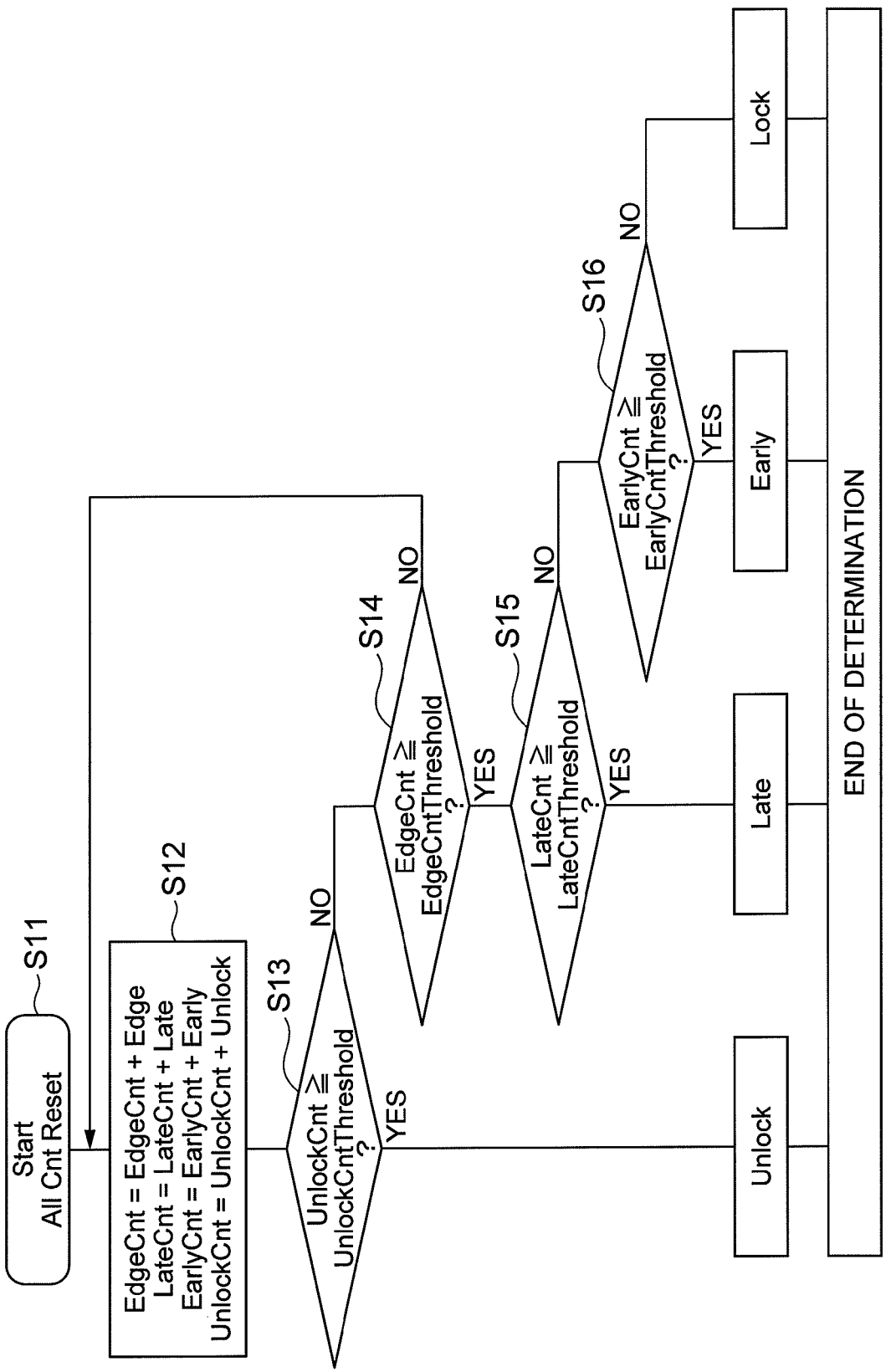
FIG. 11 is a flow chart explaining operation of the first configuration example of the detection section 25 of the reception apparatus $20_n$ according to the present embodiment.

Next, by using FIGS. 8 and 11, a first configuration example of the detection section 25 of the reception apparatus $20_n$ according to the present embodiment will be described. FIG. 8 is a diagram illustrating a configuration of the first configuration example of the detection section 25 of the reception apparatus $20_n$ according to the present embodiment. FIG. 9 is a diagram explaining operation of the first configuration example of the detection section 25 of the reception apparatus $20_n$ according to the present embodiment. FIG. 10 is a table explaining operation of the first configuration example of the detection section 25 of the reception apparatus $20_n$ according to the present embodiment. FIG. 11 is a flow chart explaining operation of the first configuration example of the detection section 25 of the reception apparatus $20_n$ according to the present embodiment.

The detection section 25 of the first configuration example detects a phase difference between the data received by the data reception section 21 and a clock received by the clock reception section 22, based on the data D and XD output from the sampler section 23. This detection section 25 includes flip-flops 251, 252, 254 and 255, a phase detection part 256, and a phase determination part 257.

The flip-flops 251 and 252 are cascade-connected, and constitute a shift register. The first stage flip-flop 251 inputs the data D output from the sampler section 23. The flip-flops 254 and 255 are cascade-connected, and constitute a shift register. The first stage flip-flop 254 inputs the data XD output from the sampler section 23.

The phase detection part 256 inputs data latched by each of flip-flops 251, 252 and 255. That is, the phase detection part 256 inputs a value D1 of a certain bit, a value D2 of the following bit, and a value XD at the time of bit transition of these two bits D1 and D2, as illustrated in FIG. 9. In addition, the phase detection part 256 inputs these data D1, XD and D2 for every clock period.

The phase detection part 256, as illustrated in FIG. 10, based on the input data D1, XD and D2, for every clock period, detects whether or not there is a data transition between these two bits (Edge), whether or not a phase of a received clock is early (Early), whether or not a phase of a received clock is late (Late), and whether or not a frequency of the received clock and a bit rate of the data are in a state of unlocking (Unlock.)

That is, the phase detection part 256, when there is a data transition between these two bits, sets a variable "Edge" as "value 1", and otherwise, sets the variable "Edge" as "value 0". When the phase of the received clock is early, a variable "Early" is set as "value 1", and otherwise, the variable "Early" is set as "value 0". When the phase of the received clock is late, the variable "Late" is set as "value 1", and otherwise, the variable "Late" is set as "value 0". Furthermore, in the case of the unlocking state, the variable "Unlock" is set as "value 1", and otherwise, the variable "Unlock" is set as "value 0". The phase detection part 256 gives each value of these variables: Edge, Early, Late and Unlock, to the phase determination part 257.

The phase determination part 257, based on each value of variables: Edge, Early, Late and Unlock, which are received from the phase detection part 256, detects a phase difference between the data received by the data reception section 21 and the clock received by the clock reception section 22. Specifically, the phase determination parts 257, as illustrated in FIG. 11, carries out the following processing by using variables: EdgeCnt, EarlyCnt, LateCnt and UnlockCnt, as well as constants: EdgeCntThreshold, EarlyCntThreshold, LateCntThreshold and UnlockCntThreshold.

In the phase determination part 257, in Step S11 first, each value of variables: EdgeCnt, EarlyCnt, LateCnt and UnlockCnt, is initialized, and subsequently, in Step S12, for every clock period, a value of the variable Edge is accumulated in the variable EdgeCnt, a value of the variable Early is accumulated in the variable EarlyCnt, a value of the variable Late is accumulated in the variable LateCnt, and a value of the variable Unlock is accumulated in the variable UnlockCnt.

In Step S13, it is determined whether the value of the variable UnlockCnt is not less than the constant UnlockCntThreshold, and if it is true, the clock frequency and the bit rate of data is determined to be in a state of unlocking (Unlock.)

In Step S13 in the case where the value of the variable UnlockCnt is determined to be less than the constant UnlockCntThreshold, in Step S14, it is determined whether the value of the variable EdgeCnt is not less than the constant EdgeCntThreshold. In Step S14 in the case where the value of the variable EdgeCnt is determined to be less than the constant EdgeCntThreshold, the step returns to Step S12.

In Step S14 in the case where the value of the variable EdgeCnt is determined to be not less than the constant EdgeCntThreshold, in Step S15, it is determined whether the value of the variable LateCnt is not less than the constant LateCntThreshold, and if it is true, the phase of the clock is determined to be late (Late.) In Step S16, it is determined whether the value of the variable EarlyCnt is not less than the constant EarlyCntThreshold, and if it is true, the phase of the clock is determined to be early (Early.) If either case is not true, the phase difference is determined to be within an allowance (Lock.)

The phase determination part 257 repeats such determination, and gives the detection signal indicating the determination result (Late, Early, Lock, Unlock) to the detection signal transmission section 26. The detection signal transmission section 26 transmits this detection signal to the detection signal reception section 14 of the transmission apparatus 10.

Figure 12:
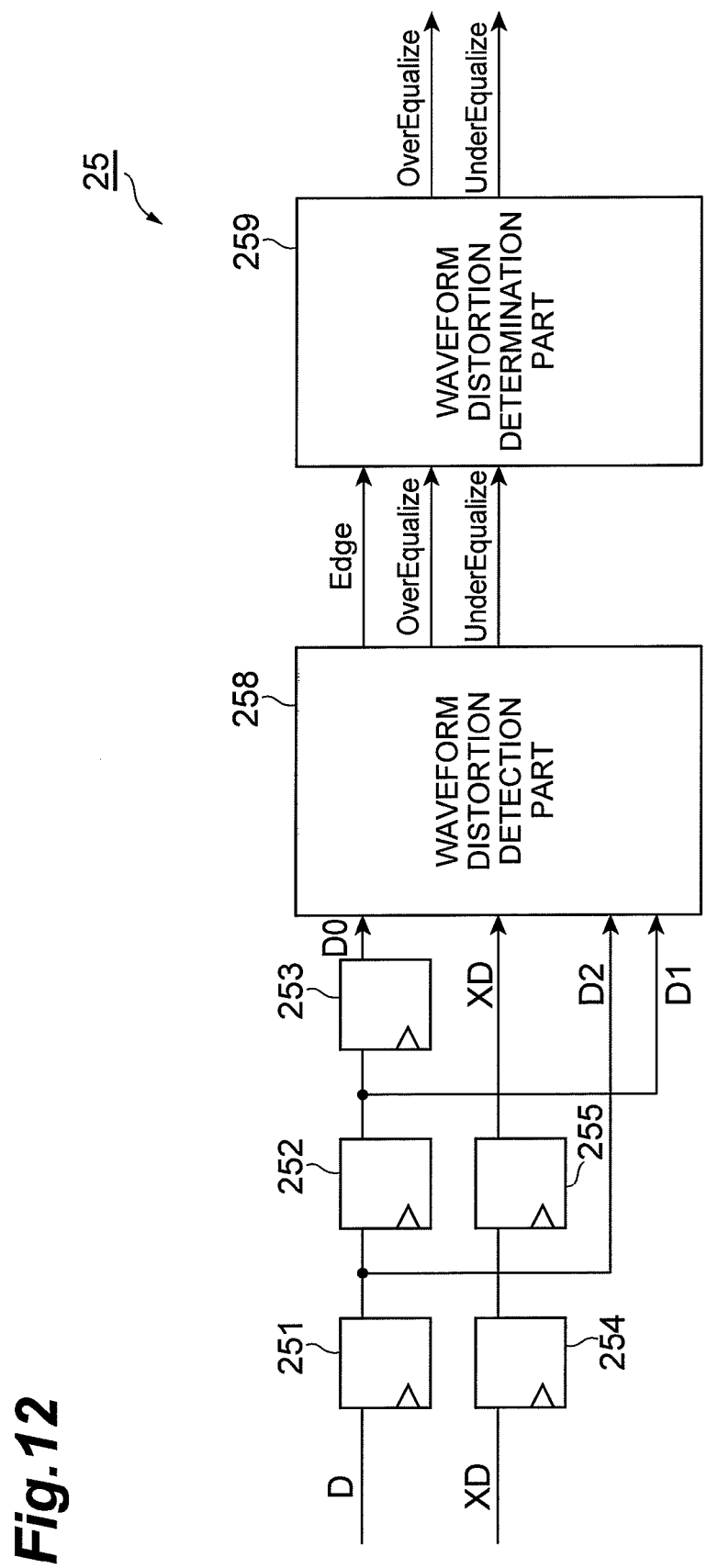
FIG. 12 is a diagram illustrating a configuration of a second configuration example of the detection section 25 of the reception apparatus $20_n$ according to the present embodiment.
Figure 13:
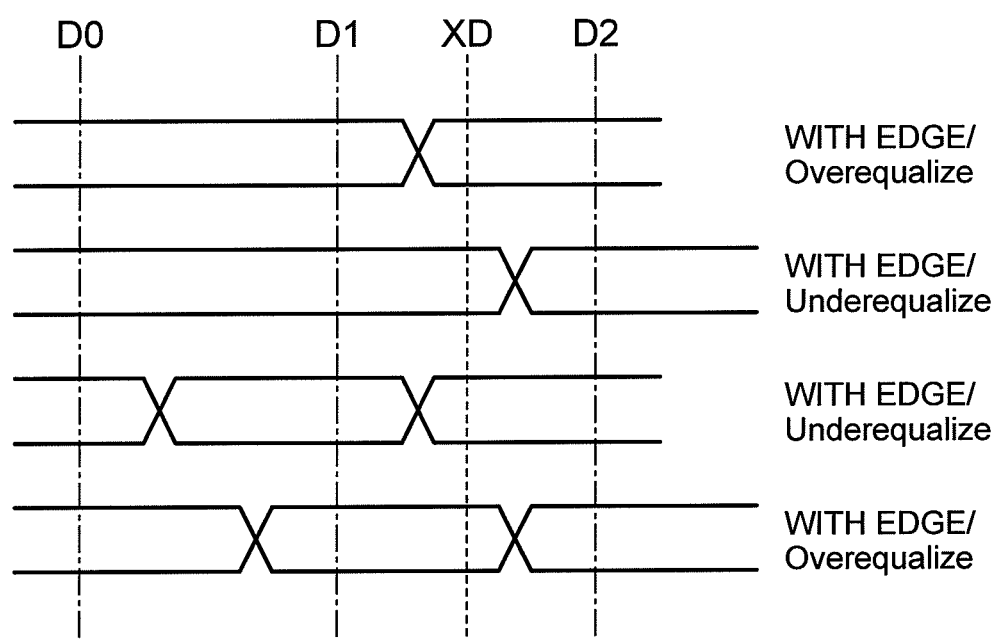
FIG. 13 is a diagram explaining operation of the second configuration example of the detection section 25 of the reception apparatus $20_n$ according to the present embodiment.
Figure 15:
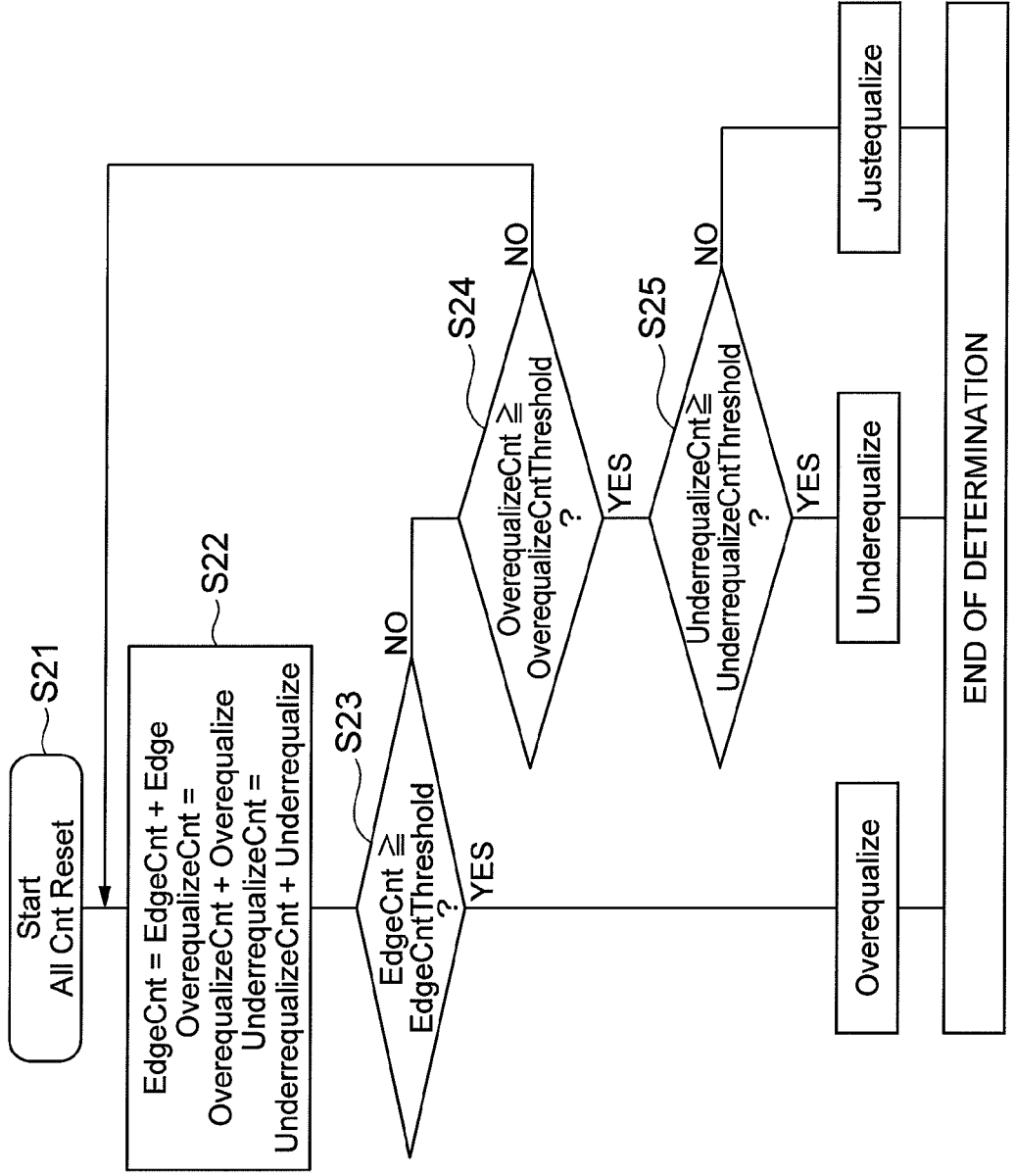
FIG. 15 is a flow chart explaining operation of the second configuration example of the detection section 25 of the reception apparatus $20_n$ according to the present embodiment.

Next, by using FIGS. 12 to 15, a second configuration example of the detection section 25 of the reception apparatus $20_n$ according to the present embodiment will be described. FIG. 12 is a diagram illustrating a configuration of a second configuration example of the detection section 25 of the reception apparatus 20, according to the present embodiment. FIG. 13 is a diagram explaining operation of the second configuration example of the detection section 25 of the reception apparatus $20_n$ according to the present embodiment. FIG. 14 is a table explaining operation of the second configuration example of the detection section 25 of the reception apparatus $20_n$ according to the present embodiment. FIG. 15 is a flow chart explaining operation of the second configuration example of the detection section 25 of the reception apparatus $20_n$ according to the present embodiment.

The detection section 25 of the second configuration example detects, based on the data D and XD output from the sampler section 23, waveform distortion of the data received by the data reception section 21. This detection section 25 includes flip-flops 251 to 255, a waveform distortion detection section 258, and a waveform distortion determination part 259.

The flip-flops 251 to 253 are cascade-connected and institute a shift register. The first stage flip-flop 251 inputs the data D output from the sampler section 23. The flip-flops 254 and 255 are cascade-connected and institute a shift register. The first stage flip-flop 254 inputs the data XD output from the sampler section 23.

The waveform distortion detection section 258 inputs data which are latched by each of flip-flops 251,252,253 and 255. That is, the waveform distortion detection section 258 inputs, as illustrated in FIG. 13, a value D0 of a certain bit, a value D1 of the following bit, a value D2 of the further following bit and a value XD at the time of bit transition of these two bits D1 and D2. In addition, the waveform distortion detection section 258 inputs these data D0, D1, XD and D2 for every clock period.

The waveform distortion detection section 258, as illustrated in FIG. 14, based on the input data D0, D1, XD and D2, for every clock period, detects whether there is a data transition between two bits D1 and D2 (Edge), whether the waveform distortion of the data is large because an amplitude of a high frequency component of the received data is small (Underequalize), whether the waveform distortion of the data is large because an amplitude of a high frequency component of the received data is large (Overequalize), and whether a frequency of the received clock and a bit rate of the data are in a state of unlocking (Unlock.)

That is, the waveform distortion detection section 258, when there is a data transition between two bits D1 and D2, sets the variable "Edge" as "value 1", and otherwise, sets the variable "Edge" as "value 0". When the waveform distortion of the data is large because the amplitude of the high frequency component of the received data is small, the variable "Underequalize" is set as "value 1", and otherwise, the variable "Underequalize" is set as "value 0". When the waveform distortion of the data is large because the amplitude of the high frequency component of the received data is large, the variable "Overequalize" is set as "value 1", and otherwise, the variable "Overequalize" is set as "value 0". In the case of the unlocking state, the variable "Unlock" is set as "value 1", and otherwise, the variable "Unlock" is set as "value 0". The waveform distortion detection section 258 gives each value of these variables: Edge, Underequalize, Overequalize and Unlock to the waveform distortion determination part 259.

The waveform distortion determination part 259, based on each value of variables: Edge, Underequalize, Overequalize and Unlock received from the waveform distortion detection section 258, detects the waveform distortion of the data received by the data reception section 21. Specifically, the waveform distortion determination part 259, as illustrated in FIG. 15, through the use of variables: EdgeCnt, OverequalizeCnt and UnderequalizeCnt, as well as constants: EdgeCntThreshold, OverequalizeCntThreshold and UnderCntThreshold, carries out the following processing.

In the waveform distortion determination part 259, in Step S21 first, each value of variables: EdgeCnt, OverequalizeCnt and UnderequalizeCnt, is initialized, and subsequently, in Step S12, for every clock period, a value of the variable Edge is accumulated in the variable EdgeCnt, a value of the variable Overequalize is accumulated in the variable OverequalizeCnt and a value of the variable Underequalize is accumulated in the variable UnderequalizeCnt.

In Step S23, it is determined whether the value of the variable EdgeCnt is not less than the constant EdgeCntThreshold. In Step S23, in the case where the value of the variable EdgeCnt is determined to be less than the constant EdgeCntThreshold, the step returns to Step S22.

In Step S23, in the case where the value of the variable EdgeCnt is determined to be not less than the constant EdgeCntThreshold, it is determined, in Step S24, whether the value of the variable OverequalizeCnt is not less than the constant OverequalizeCntThreshold, and if it is true, waveform distortion of the data is determined to be large (Overequalize) because the amplitude of the high frequency component of the received data is large. In Step S25, it is determined whether the value of the variable UnderequalizeCnt is not less than the constant UnderequalizeCntThreshold, and if it is true, waveform distortion of the data is determined to be large (Underequalize) because the amplitude of the high frequency component of the received data is small. If either case is not true, the amplitude of the high frequency component of the received data is determined to be within an allowance (Justequalize).

The waveform distortion determination part 259 repeats such determination, and gives the detection signal indicating the determination result (Overequalize, Underequalize, Justequalize) to the detection signal transmission section 26. The detection signal transmission section 26 transmits this detection signal to the detection signal reception section 14 of the transmission apparatus 10.

Meanwhile, the detection section 25 may include flip-flops 251 to 255, the phase detection part 256, the phase determination part 257, the waveform distortion detection section 258 and the waveform distortion determination part 259, and perform both of detection of the phase difference between the data received by the data reception section 21 and the clock received by the clock reception section 22, and detection of the waveform distortion of data received by the data reception section 21.

Figure 16:
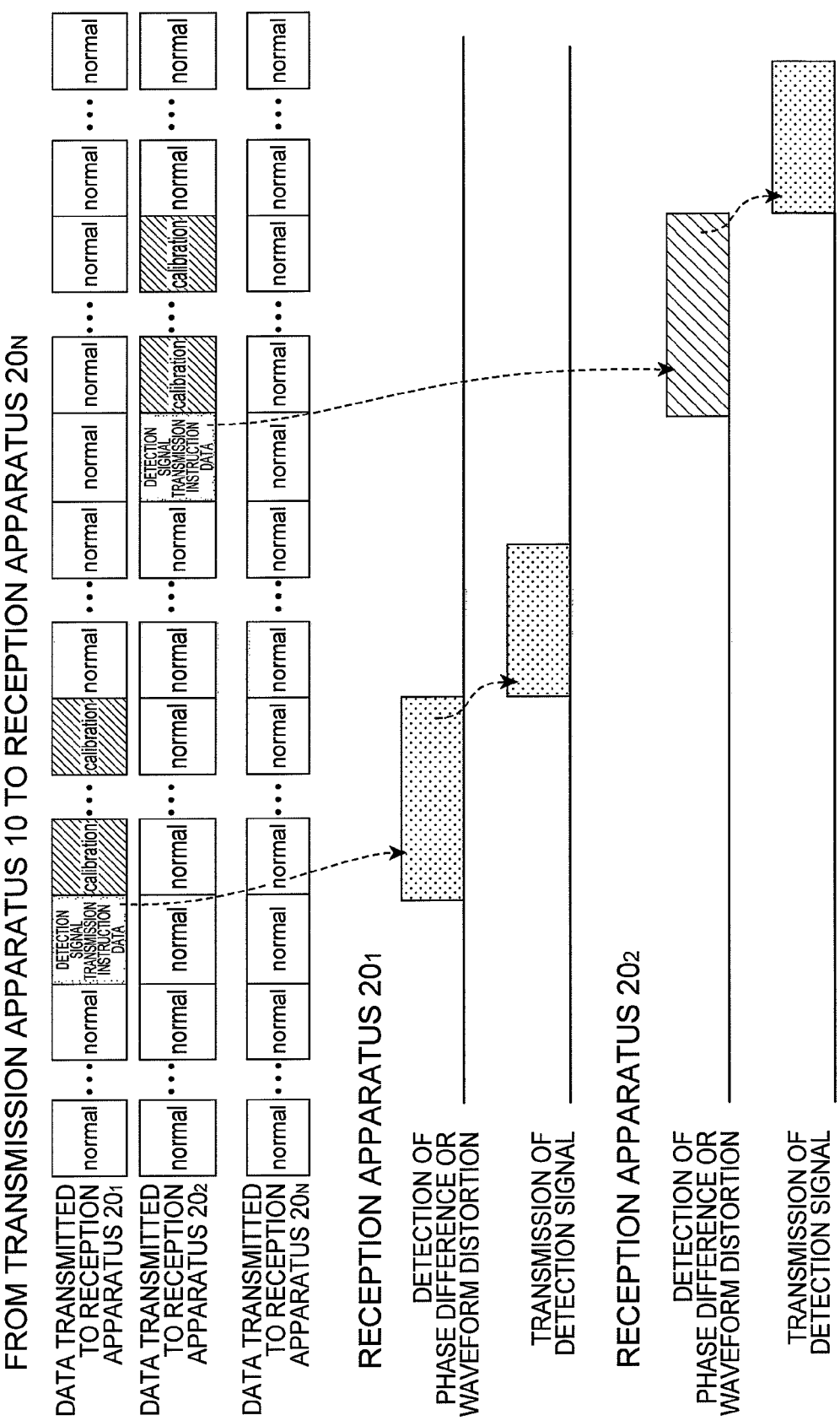
FIG. 16 is a diagram explaining timing of transmitting/receiving of detection signal transmission instruction data and a detection signal between the transmission apparatus 10 and the reception apparatus $20_n$ according to the present embodiment.

Next, by using FIG. 16, transmission of the data and the detection signal transmission instruction data from the transmission apparatus 10 to the reception apparatus $20_n$ and transmission of the detection signal from the reception apparatus $20_n$ to the transmission apparatus 10 will be described. FIG. 16 is a diagram illustrating timing of transmitting/receiving of the detection signal transmission instruction data and the detection signal between the transmission apparatus 10 and the reception apparatus $20_n$ according to the present embodiment.

The data transmission section 11 included in the transmission sections $19_n$ of the transmission apparatus 10, under control by the control section 15, transmits to the reception apparatus at a predetermined timing, each data of normal data (indicated as "normal" in the diagram) used for image-displaying in the image display section 30, data for calibration (indicated as "calibration" in the diagram) used for detection of the phase difference or waveform distortion in the reception apparatus $20_n$, and the detection signal transmission instruction data instructing the reception apparatus $20_n$ to detect the phase difference or waveform distortion and transmit the detection signal.

The transmission apparatus 10, during a period (for example, blanking period) other than a period in which the normal data is transmitted, transmits to the reception apparatus $20_n$ the detection signal transmission instruction data, and subsequently, transmits the data for calibration. The reception apparatus $20_n$ which has received the detection signal transmission instruction data, detects, from detection section 25, the phase difference or waveform distortion through the use of the data for calibration received subsequently, and transmits the detection signal indicating the result of detection to the transmission apparatus 10. Such transmitting/receiving is performed sequentially on N reception apparatus $20_1$ to $20_N$.

Meanwhile, the data used at the time of detecting the phase difference or waveform distortion in the detection section 25 of the reception apparatus $20_n$, may be the normal data used for the image-displaying in the image display section 30. In this case, the reception apparatus $20_n$, after receiving the detection signal transmission instruction data, can transmit, to the transmission apparatus 10, the detection signal indicating the result of the phase difference or waveform distortion which have been detected by that time by the detection section 25.

Next, by using FIGS. 17 and 18, adjustment of a phase and an amplitude of data by the control section 15 in the transmission apparatus 10 will be described. The control section 15 of the transmission apparatus 10, using a value of the detection signal which has been transmitted from the detection signal transmission section 26 of the reception apparatus $20_n$ and received by the detection signal reception section 14, performs control on the buffer 111 and phase shift part 113 of the data transmission section 11 included in the transmission section $19_n$. This detection signal indicates variables: Late, Early, and Lock, Unlock, Overequalize, Underequalize and Justequalize, which have been acquired by detection of the phase difference and waveform distortion by the detection section 25 of the reception apparatus $20_n$.

Figure 17:
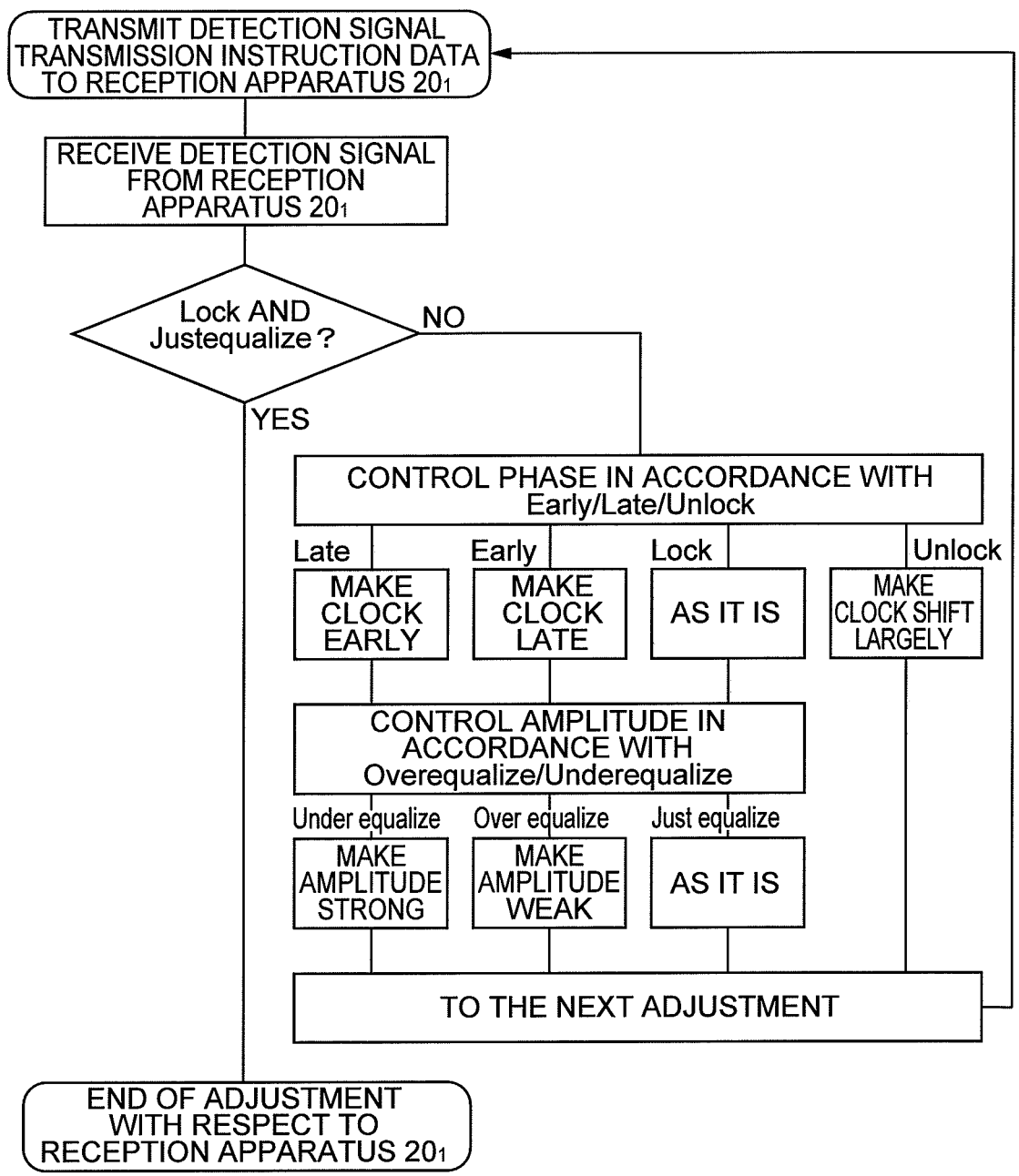
FIG. 17 is a flow chart explaining a first adjustment example of a phase and an amplitude of data by a control section 15 in the transmission apparatus 10 according to the present embodiment.

FIG. 17 is a flow chart illustrating a first adjustment example of a phase and an amplitude of the data by the control section 15 in the transmission apparatus 10 according to the present embodiment. In the first adjustment example illustrated in this figure, when both of the variable Lock and the variable Justequalize are significant values, that is, when a phase difference of the data and clock received by the reception apparatus $20_n$ is within an allowance and the amplitude of the high frequency component of this data is within an allowance, the control section 15 does not perform any adjustment on the buffer 111 and phase shift part 113 of the data transmission section 11 included in the transmission section $19_n$ corresponding to the reception apparatus $20_n$, but performs processing on the next reception apparatus $20_{n+1}$.

The control section 15, when either of the variable Lock and the variable Justequalize is not a significant value, performs control as follows.

When the variable Late is a significant value (when the phase of the clock is late with respect to the data received by the reception apparatus $20_n$), the control section 15 makes the phase of the clock early with respect to the data by a specified quantity by performing adjustment on the phase shift part 113 of the data transmission section 11 included in the transmission section $19_n$.

When the variable Early is a significant value (when the phase of the clock is early with respect to the data received by the reception apparatus $20_n$), the control section 15 makes the phase of the clock late with respect to the data by a specified quantity by performing adjustment on the phase shift part 113 of the data transmission section 11 included in the transmission section $19_n$.

When the variable Lock is a significant value (when the phase difference of the data and clock received by the reception apparatus $20_n$ is within an allowance), the control section 15 does not perform any adjustment on the phase shift part 113 of the data transmission section 11 included in the transmission section $19_n$.

When the variable Unlock is a significant value (when the frequency of the clock and the bit rate of the data which are received by the reception apparatus $20_n$ are in a state of unlocking), the control section 15 changes the phase of the clock largely by performing adjustment on the phase shift part 113 of the data transmission section 11 included in the transmission section $19_n$.

When the variable Unlock is not a significant value, in accordance with each value of the variables: Overequalize, Underequalize and Justequalize, the control section 15 performs control further as follows.

When variable Overequalize is a significant value (when the waveform distortion of the data is large because the amplitude of the high frequency component of the data received by the reception apparatus $20_n$ is large), the control section 15 increases the bit data amplitude after the data level transition by a specified quantity by performing adjustment on the buffer 111 of the data transmission section 11 included in the transmission section $19_n$.

When variable Underequalize is a significant value (when the waveform distortion of the data is large because the amplitude of the high frequency component of the data received by the reception apparatus $20_n$ is small), the control section 15 decreases the bit data amplitude after the data level transition by a specified quantity by performing adjustment on the buffer 111 of the data transmission section 11 included in the transmission section $19_n$.

When the variable Justequalize is a significant value (when the amplitude of the high frequency component of the data received by the reception apparatus $20_n$ is within an allowance), the control section 15 does not perform any adjustment on the buffer 111 of the data transmission section 11 included in the transmission section $19_n$.

After the above adjustment processing is completed, the control section 15 transmits the detection signal transmission instruction data to the reception apparatus $20_n$, receives the detection signal from the reception apparatus $20_n$, and performs the above adjustment processing again. Then, when both of the variable Lock and the variable Justequalize become a significant value, the control section 15 terminates processing with respect to the reception apparatus $20_n$, and performs processing on the next reception apparatus $20_{n+1}$.

Figure 18:
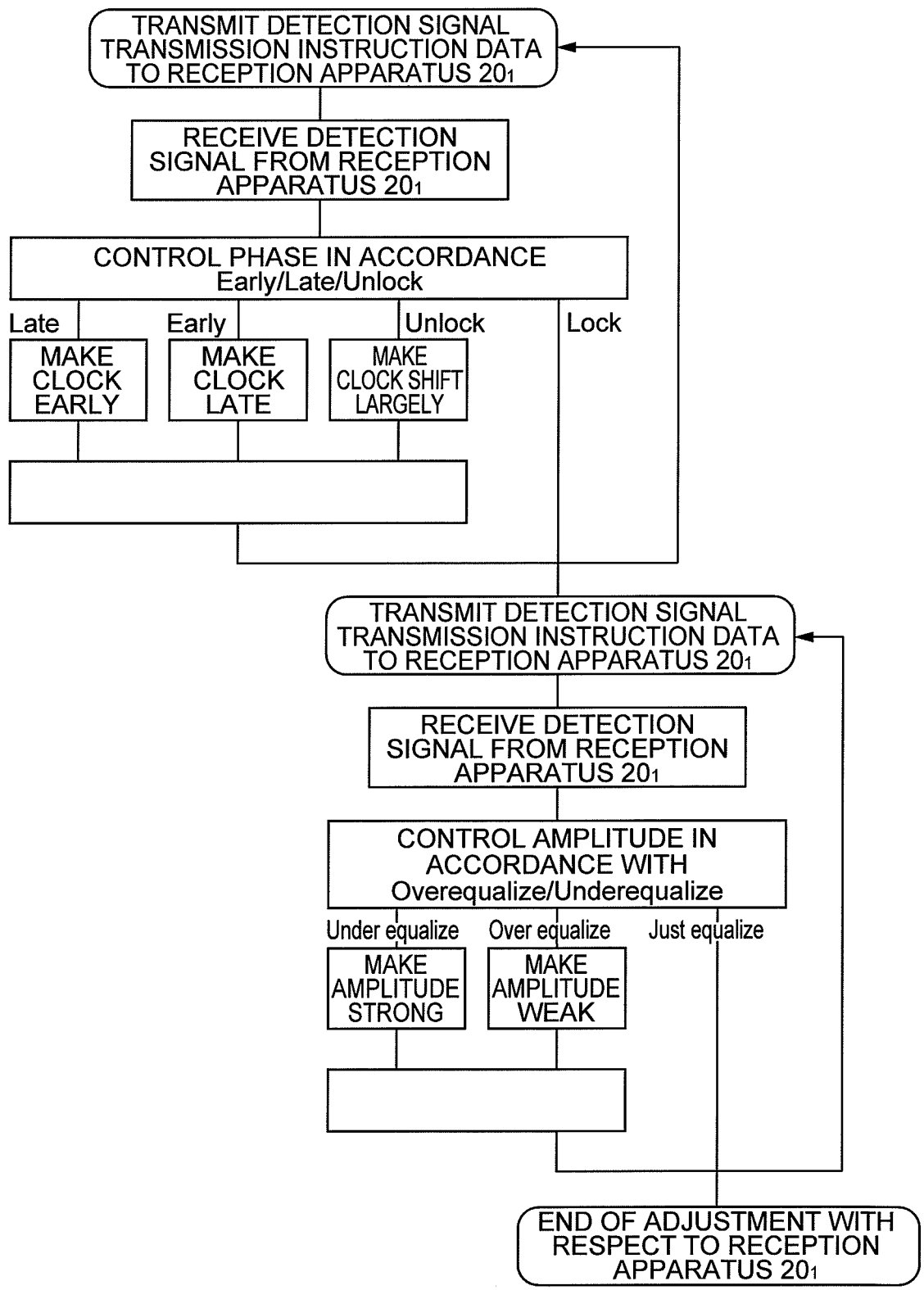
FIG. 18 is a flow chart explaining a second adjustment example of a phase and an amplitude of the data by the control section 15 in the transmission apparatus 10 according to the present embodiment.

FIG. 18 is a flow chart illustrating a second adjustment example of a phase and an amplitude of the data by the control section in the transmission apparatus 10 according to the present embodiment. In the second adjustment example illustrated in this figure, until the variable Lock becomes a significant value (the phase difference between the data and clock received by the reception apparatus $20_n$ is within an allowance), the control section 15 repeats transmission of the detection signal transmission instruction data to the reception apparatus $20_n$, reception of the detection signal from the reception apparatus $20_n$, as well as adjustment for the phase shift part 113 carried out depending on whether any of the variables: Late, Early and Unlock is a significant value.

In the case where the variable Lock is a significant value, until the variable Justequalize becomes a significant value (the amplitude of the high frequency component of the data received by the reception apparatus $20_n$ is within an allowance), the control section 15 repeats transmission of the detection signal transmission instruction data to the reception apparatus $20_n$, reception of the detection signal from the reception apparatus $20_n$, as well as adjustment on the buffer 111, performed depending on whether any of the variables: Overequalize and Underequalize is a significant value.

The adjustment on the phase shift part 113 or the buffer 111 in the second adjustment example is the same as that of the first adjustment example. Then, if both of the variable Lock and the variable Justequalize become a significant value, the control section 15 terminates processing with respect to the reception apparatus $20_n$, and performs processing on the next reception apparatus $20_n+1$.

Figure 19:
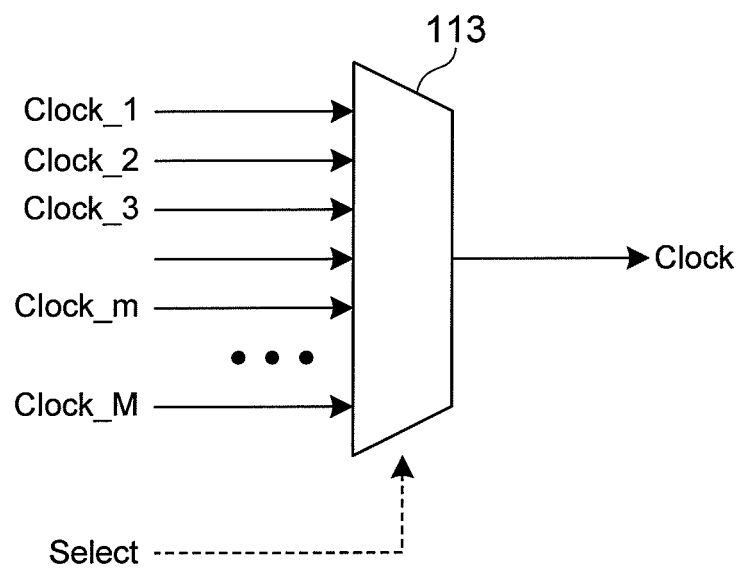
FIG. 19 is a diagram illustrating a configuration of a phase shift part 113 of a data transmission section 11 in the transmission apparatus 10 according to the present embodiment.
Figure 20:
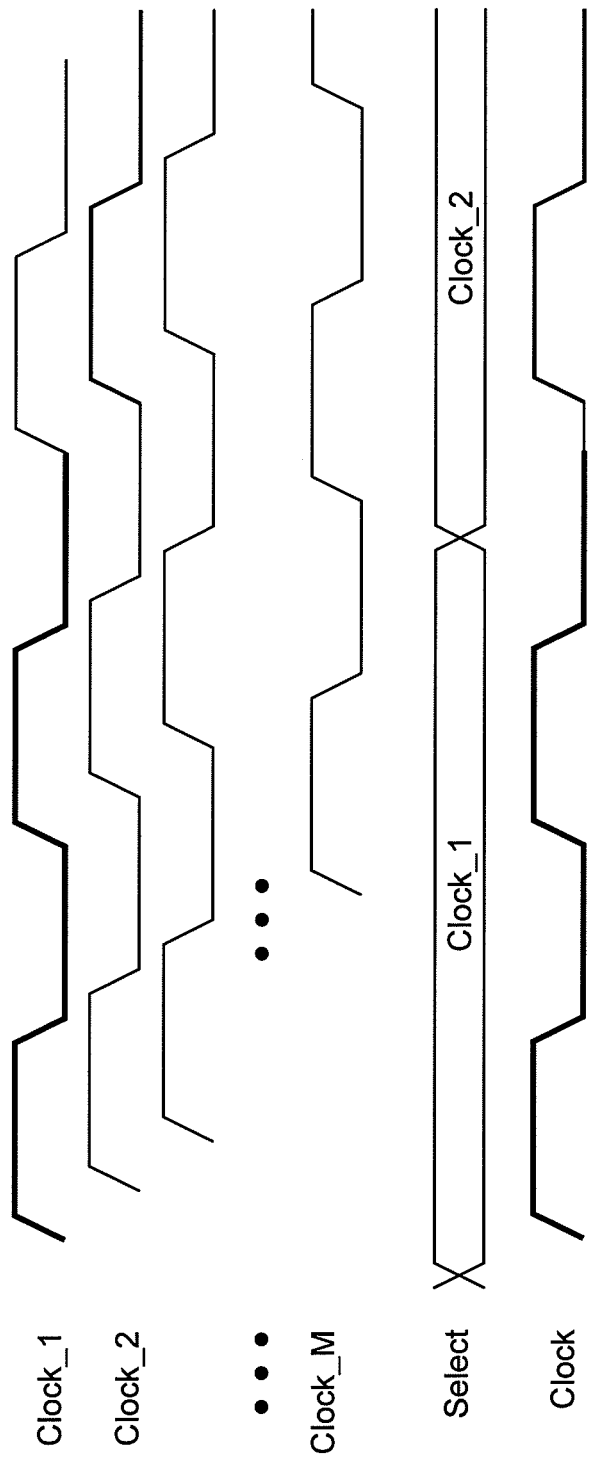
FIG. 20 is a diagram explaining operation of the phase shift part 113 of the data transmission section 11 in the transmission apparatus 10 according to the present embodiment.

Next, by using FIGS. 19 and 20, phase adjustment by the phase shift part 113 of the data transmission section 11 in the transmission apparatus 10 will be described. FIG. 19 is a diagram illustrating a configuration of the phase shift part 113 of the data transmission section 11 in the transmission apparatus 10 according to the present embodiment. FIG. 20 is a diagram explaining operation of the phase shift part 113 of the data transmission section 11 in the transmission apparatus 10 according to the present embodiment.

In this example, the clock generation section 16 is a PLL frequency synthesizer for example, and outputs M-phase clocks Clock_1 to Clock_M having a different phase by a specified quantity. Then, the phase shift part 113 inputs M-phase clocks Clock_1 to Clock_M output from the clock generation section 16, and at the same time, inputs a selection instructing signal Select output from the control section 15, and among M-phase clocks Clock_1 to Clock_M, outputs selectively the clock Clock instructed by the selection instructing signal Select to the flip-flop 112. Thereby, the phase difference between the data and clock sent from the transmission apparatus 10 is adjusted, and the phase difference between the data and clock received by the reception apparatus $20_n$ is set to be within an allowance.

Figure 21:
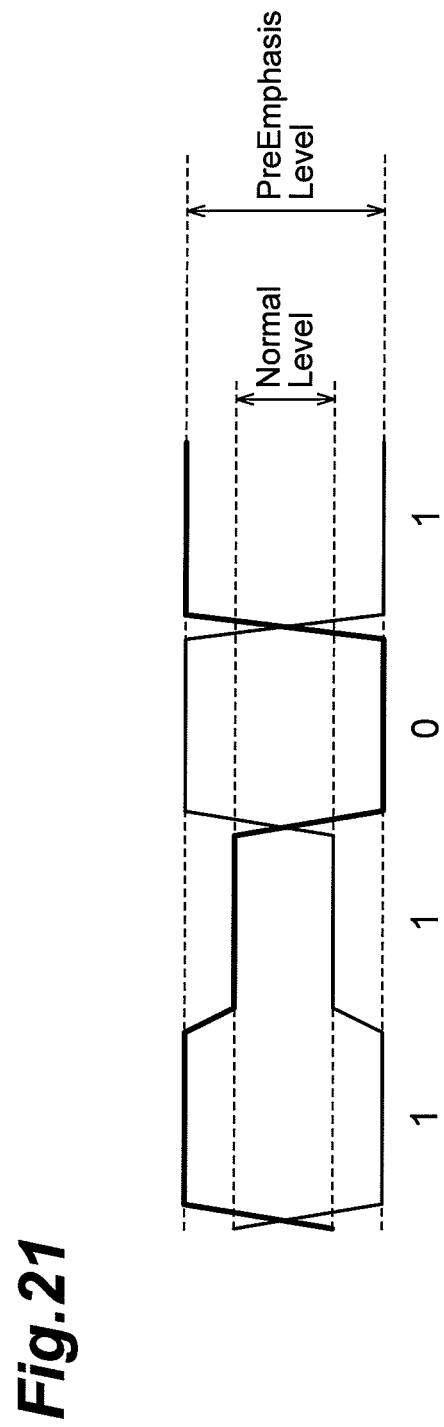
FIG. 21 is a waveform chart explaining amplitude adjustment by a buffer 111 of the data transmission section 11 in the transmission apparatus 10 according to the present embodiment.

Next, by using FIG. 21, amplitude adjustment by the buffer 111 of the data transmission section 11 in the transmission apparatus 10 will be described. FIG. 21 is a waveform chart explaining the amplitude adjustment by the buffer 111 of the data transmission section in the transmission apparatus 10 according to the present embodiment. As illustrated in this diagram, the buffer 111, by the instruction from the control section 15, increases a bit data amplitude (PreEmphasisLevel) after the level transition of the data to be transmitted as compared with the bit data amplitude (Normal Level) having the same level as the previous bit. In addition, the buffer 111 adjusts, by the instruction from the control section 15, the bit data amplitude (PreEmphasisLevel) after the level transition of the data to be transmitted. Thereby, an amplitude of a high frequency component of the data sent out from the transmission apparatus 10 is set to be an appropriate value, and the amplitude of the high frequency component of the data received by the reception apparatus $20_n$ is set to be within an allowance, and distortion of the data is suppressed.

Figure 22:
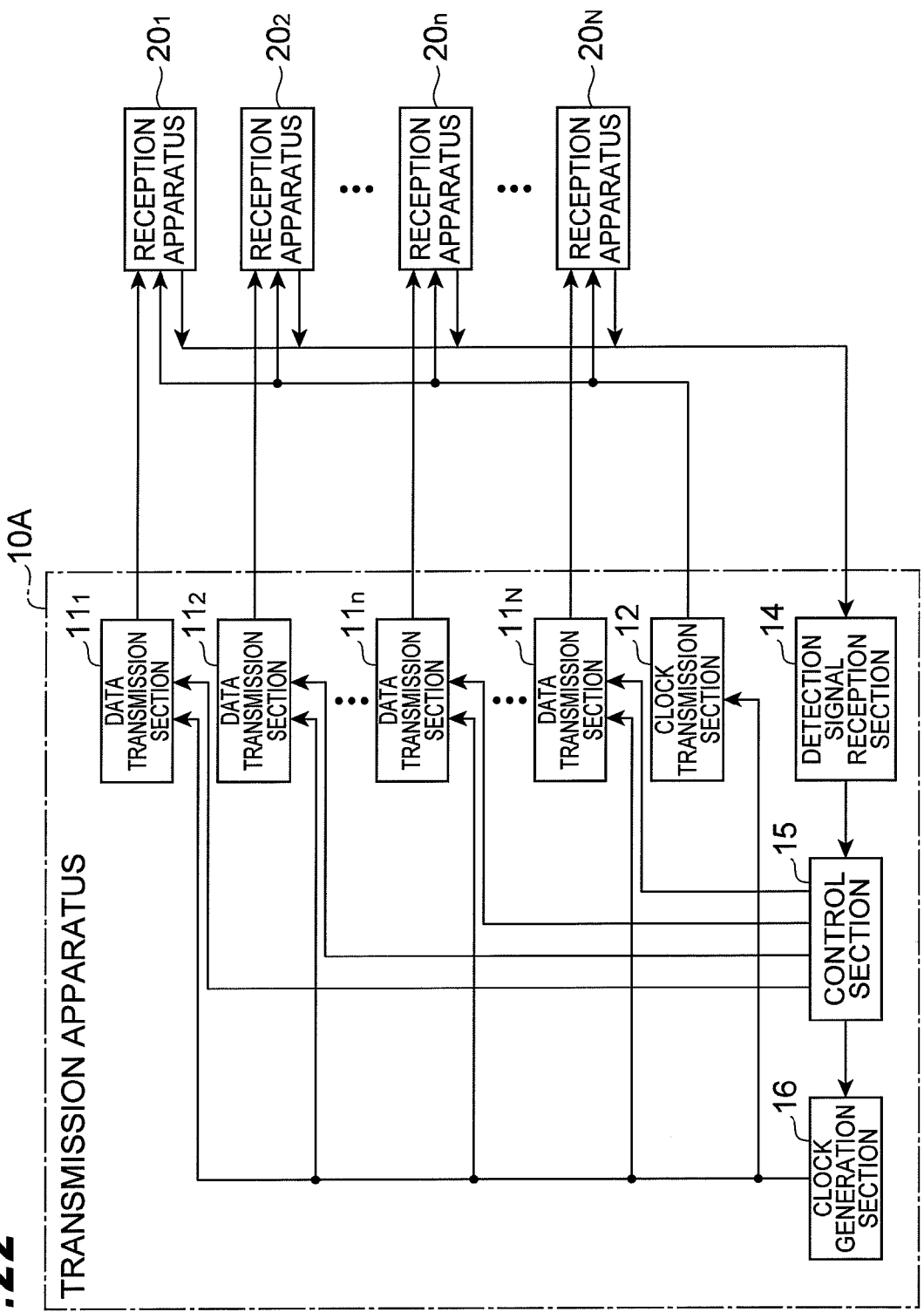
FIG. 22 is a schematic diagram illustrating a configuration of a modified transmission apparatus 10A.

Next, by using FIG. 22, a modified example of the transmission apparatus 10 according to the present embodiment will be described. FIG. 22 is a schematic diagram illustrating a configuration of a modified transmission apparatus 10A. The transmission apparatus 10 of the embodiment which has been described heretofore, has been one provided with N sets of the data transmission section 11 and clock transmission section 12 (N is plural integers), where in each of sets, a phase of data has been adjusted with respect to a clock. Therefore, these clock transmission sections can be set to be one which is common. Then, the transmission apparatus 10A of the modified example illustrated in FIG. 22 is provided with N data transmission sections $11_1$ to $11_N$ and one clock transmission section 12. It should be noted that illustration of the encoder section is omitted in this figure.

Each of N data transmission sections $11_1$ to $11_N$ has the same configuration as the data transmission section 11 in the embodiment which has been described heretofore. The data transmission section $11n$ and the reception apparatus $20_n$ are associated with each other on a one-to-one basis. The clock transmission section 12 has the same configuration as the clock transmission section 12 in the embodiment which has been described heretofore.

The control section 15, based on the detection signal transmitted from the reception apparatus $20_n$ and received by the detection signal reception section 14, adjusts a phase between data transmitted by the data transmission section $11_n$ and a clock transmitted by the clock transmission section 12 by controlling the phase shifting amount of the reference clock in the phase shift part 113 of the data transmission section $11_n$. In addition, the control section 15, by controlling an output amplitude in the buffer 111 of the data transmission section $11_n$, adjusts an amplitude of the data transmitted by the data transmission section $11_n$.

In this modified example, since a signal line for transmitting a clock to N reception apparatus $20_1$ to $20_N$ from the transmission apparatus 10A can be set to be common, the number of signal lines between the transmission apparatus 10A and N reception apparatuses $20_1$ to $20_N$ can be lessened.

REFERENCE SIGNS LIST

1 . . . image display system, 10 and 10A . . . transmission apparatus, 11 . . . data transmission section, 12 . . . clock transmission section, 13 . . . encoder section, 14 . . . detection signal reception section, 15 . . . control section, 16 . . . clock generation section, 19 . . . transmission section, 20 . . . reception apparatus, 21 . . . data reception section, 22 clock reception section, 23 . . . sampler section, 24 . . . decoder section, 25 . . . detection section, 26 . . . detection signal transmission section, 30 . . . image display section, 31 . . . signal line.

The invention claimed is:

1. A transmission apparatus that transmits data and a clock to a reception apparatus, the transmission apparatus comprising:
    a data transmission section that transmits data to the reception apparatus;
    a clock transmission section that transmits a clock to the reception apparatus;
    a detection signal reception section that receives, from the reception apparatus, a detection signal indicating a phase difference between the data and the clock, and a waveform distortion of the data, which have been detected in the reception apparatus that has received the data transmitted by the data transmission section and the clock transmitted by the clock transmission section; and
    a control section that performs, based on a detection signal received by the detection signal reception section, control of an adjustment of a phase between data transmitted by the data transmission section and a clock transmitted by the clock transmission section and an adjustment of an amplitude of data transmitted by the data transmission section,
    wherein the detection signal is generated based on a first data, acquired by sampling the transmitted data at a rising edge of the transmitted clock, and a second data, acquired by sampling the transmitted data at a falling edge of the transmitted clock, such that the phase difference is detected based on the first data and the second data.

2. The transmission apparatus according to claim 1, wherein the control section causes the data transmission section to transmit, to the reception apparatus, detection signal transmission instruction data that instructs the reception apparatus to transmit the detection signal.

3. The transmission apparatus according to claim 1, comprising a plurality of sets of the data transmission sections and clock transmission sections.

4. The transmission apparatus according to claim 1, comprising a plurality of the data transmission sections and one of the clock transmission section.

5. The transmission apparatus according to claim 1, wherein the control section adjusts selectively a bit data amplitude after the data level transition at the time of performing control of adjustment of an amplitude of data transmitted by the data transmission section.

6. A reception apparatus that receives data and a clock from a transmission apparatus, the reception apparatus comprising;
- a data reception section that receives data from the transmission apparatus;
- a clock reception section that receives a clock from the transmission apparatus;
- a sampler section that samples, by the clock received by the clock reception section, the data received by the data reception section and outputs a first data acquired at a rising edge of the clock received by the clock reception section and a second data acquired at a falling edge of the clock received by the clock reception section;
- a detection section that performs, based on the data output from the sampler section, detection of a phase difference between the data received by the data reception section and the clock received by the clock reception section, and a waveform distortion of the data received by the data reception section; and
- a detection signal transmission section that transmits a detection signal indicating a result of detection by the detection section to the transmission apparatus,
- wherein the detection section receives the first data and the second data and detects the phase difference based on the first data and the second data.

7. The reception apparatus according to claim 6, wherein the data reception section receives, from the transmission apparatus, detection signal transmission instruction data that instructs to transmit the detection signal, and
- the detection signal transmission section, in response to the data reception section having received the detection signal transmission instruction data, transmits the detection signal to the transmission apparatus.

8. The reception apparatus according to claim 6, wherein the sampler section samples and outputs data at the time of bit transition among data received by the data reception section, and
- the detection section performs detection of the phase difference and the waveform distortion based on data, at the time of bit transition, which is sampled and output by the sampler section.

9. A transmission-reception system comprising: a transmission apparatus and a reception apparatus,
- the transmission apparatus transmitting data and a clock to the reception apparatus, including:
- a data transmission section that transmits data to the reception apparatus;
- a clock transmission section that transmits a clock to the reception apparatus;
- a detection signal reception section that receives, from the reception apparatus, a detection signal indicating a phase difference between data and a clock, and a waveform distortion of the data, which have been detected in the reception apparatus that has received the data transmitted by the data transmission section and the clock transmitted by the clock transmission section; and
- a control section that performs, based on a detection signal received by the detection signal reception section, control of an adjustment of a phase between data transmitted by the data transmission section and a clock transmitted by the clock transmission section, and an adjustment of an amplitude of data transmitted by the data transmission section,
the reception apparatus receiving data and a clock from the transmission apparatus, including:
- a data reception section that receives data from the transmission apparatus;
- a clock reception section that receives a clock from the transmission apparatus;
- a sampler section that samples data received by the data reception section by a clock received by the clock reception section, and outputs a first data acquired at a rising edge of the clock received by the clock reception section and a second data acquired at a falling edge of the clock received by the clock reception section;
- a detection section that performs, based on data output from the sampler section, detection of the phase difference between data received by the data reception section and a clock received by the clock reception section, and the waveform distortion of data received by the data reception section; and
- a detection signal transmission section that transmits a detection signal indicating a result of detection by the detection section to the transmission apparatus,
wherein:
the data reception section of the reception apparatus receives data transmitted by the data transmission section of the transmission apparatus;
the clock reception section of the reception apparatus receives a clock transmitted by the clock transmission section of the transmission apparatus;
the detection signal reception section of the transmission apparatus receives a detection signal transmitted by the detection signal transmission section of the reception apparatus,
the detection section receives the first data and the second data, and detects the phase difference based on the first data and the second data.

10. The transmission-reception system according to claim 9, wherein:
in the transmission apparatus, the control section causes the data transmission section to transmit, to the reception apparatus, detection signal transmission instruction data instructing the reception apparatus to transmit the detection signal;
in the reception apparatus, the data reception section receives, from the transmission apparatus, detection signal transmission instruction data instructing to transmit the detection signal; and
the detection signal transmission section, in response to the data reception section having received the detection signal transmission instruction data, transmits the detection signal to the transmission apparatus,
wherein:
the data reception section of the reception apparatus receives data and detection signal transmission instruction data which are transmitted by the data transmission section of the transmission apparatus;

the clock reception section of the reception apparatus receives a clock transmitted by the clock transmission section of the transmission apparatus; and the detection signal reception section of the transmission apparatus receives a detection signal transmitted by the detection signal transmission section of the reception apparatus.

11. The transmission-reception system according to claim 10, wherein:

the transmission apparatus includes a plurality of data transmission sections;

the plurality of data transmission sections included in the transmission apparatus and a plurality of reception apparatuses are associated with each other on a one-to-one basis;

transmission of detection signal transmission instruction data from the transmission apparatus to each of the plurality of reception apparatuses is performed at a different timing from each other; and transmission of a detection signal from each of the plurality of reception apparatuses to the transmission apparatus is performed at a different timing from each other.

12. The transmission-reception system according to claim 11, wherein the detection signal reception section of the transmission apparatus receives, via a common signal line, a detection signal transmitted by the detection signal transmission section of each of the plurality of reception apparatuses.

13. An image display system comprising:
a transmission-reception system according to claim 11; and
an image display section that displays an image based on data received by each of the plurality of reception apparatuses included in the transmission-reception system.

14. The transmission-reception system according to claim 9, comprising:

a plurality of sets of the data transmission sections and the clock transmission sections in the transmission apparatus, wherein:

the number of the reception apparatuses is plural;

the plurality of data transmission sections included in the transmission apparatus and the plurality of reception apparatuses are associated with each other on a one-to-one basis;

the data reception section of each of the plurality of reception apparatuses receives data transmitted by the corresponding data transmission section included in the transmission apparatus;

the clock reception section of each of the plurality of reception apparatuses receives a clock transmitted by the corresponding clock transmission section included in the transmission apparatus; and the detection signal reception section of the transmission apparatus receives a detection signal transmitted by the detection signal transmission section of each of the plurality of reception apparatuses.

15. The transmission-reception system according to claim 14, wherein the detection signal reception section of the transmission apparatus receives, via a common signal line, a detection signal transmitted by the detection signal transmission section of each of the plurality of reception apparatuses.

16. An image display system comprising:
a transmission-reception system according to claim 14; and
an image display section that displays an image based on data received by each of the plurality of reception apparatuses included in the transmission-reception system.

17. The transmission-reception system according to claim 9, comprising:

the plurality of data transmission sections and one of the clock transmission section in the transmission apparatus, wherein:

the number of the reception apparatuses is plural;

the plurality of data transmission sections included in the transmission apparatus and the plurality of reception apparatuses are associated with each other on a one-to-one basis;

the data reception section of each of the plurality of reception apparatuses receives data transmitted by the corresponding data transmission section included in the transmission apparatus;

the clock reception section of each of the plurality of reception apparatuses receives a clock transmitted by the clock transmission section of the transmission apparatus; and the detection signal reception section of the transmission apparatus receives a detection signal transmitted by the detection signal transmission section of each of the plurality of reception apparatuses.

18. The transmission-reception system according to claim 17, wherein the detection signal reception section of the transmission apparatus receives, via a common signal line, a detection signal transmitted by the detection signal transmission section of each of the plurality of reception apparatuses.

19. An image display system comprising:
a transmission-reception system according to claim 17; and
an image display section that displays an image based on data received by each of the plurality of reception apparatuses included in the transmission-reception system.

20. The reception apparatus according to claim 6, wherein the detection section detects from the first data, a first bit and a second bit following the first bit, and determines the phase difference based on the first bit, the second bit and second data.

21. The reception apparatus according to claim 20, wherein the detection section determines, for every clock period, whether there is a transition between the first bit and the second bit, whether the phase of the clock is early, whether the phase of the clock is late or whether a frequency of the clock and a bit rate of the data are in a state of unlocking, based on the first bit, the second bit and second data.

22. The reception apparatus according to claim 21, wherein the detection section, for every clock period, accumulates an early value when the phase of the clock is early, and accumulates a late value when the phase of the clock is late.

23. The reception apparatus according to claim 22, wherein the detection part determines that the phase of the clock is late if the late value count is greater than a late count threshold value, and determines that the phase of the clock is early if the early value count is greater that an early count threshold value.

* * * * *